(12) United States Patent
Smith

(10) Patent No.: US 10,611,317 B2
(45) Date of Patent: Apr. 7, 2020

(54) TAIL GATE SHROUD

(71) Applicant: INVENTIONS INCORPORATED, LLC, Huntsville, AL (US)

(72) Inventor: Timothy Smith, Huntsville, AL (US)

(73) Assignee: INVENTIONS INCORPORATED, LLC, Huntsville, AL (US)

(*) Notice: Subject to any disclaimer, the term of this patent is extended or adjusted under 35 U.S.C. 154(b) by 0 days.

(21) Appl. No.: 16/502,330

(22) Filed: Jul. 3, 2019

(65) Prior Publication Data

US 2019/0322225 A1 Oct. 24, 2019

Related U.S. Application Data

(63) Continuation-in-part of application No. 15/888,311, filed on Feb. 5, 2018.

(51) Int. Cl.
 *B60R 13/01* (2006.01)
 *B62D 33/027* (2006.01)

(52) U.S. Cl.
 CPC .......... *B60R 13/01* (2013.01); *B62D 33/0273* (2013.01); *B60R 2013/016* (2013.01)

(58) Field of Classification Search
 CPC .............................. B62D 33/0273; B62D 33/03
 USPC ........................................................ 296/57.1
 See application file for complete search history.

(56) References Cited

U.S. PATENT DOCUMENTS

| | | | |
|---|---|---|---|
| 4,763,945 A | 8/1988 | Murray | |
| 5,188,415 A | 2/1993 | Wagner | |
| 5,904,391 A * | 5/1999 | Liljenquest | B62D 33/0273 296/57.1 |
| 6,474,654 B1 | 11/2002 | Schmeichel | |
| 6,540,278 B2 | 4/2003 | Presley | |
| 6,749,245 B1 | 6/2004 | Walker | |
| 7,052,070 B1 | 5/2006 | Simonin | |
| 7,547,055 B2 | 6/2009 | Stratten | |
| 8,459,716 B2 | 6/2013 | Kaplan | |
| 9,016,753 B2 | 4/2015 | McDermott, III | |
| 9,255,431 B2 | 2/2016 | Noh | |
| 9,316,044 B2 | 4/2016 | Hemphill | |
| 9,862,335 B2 * | 1/2018 | Vu | B60R 13/06 |
| 2005/0073167 A1 | 4/2005 | DeGaillard | |
| 2011/0080017 A1 | 4/2011 | Olson | |
| 2012/0223541 A1 * | 9/2012 | Gianino | B62D 33/0273 296/57.1 |
| 2016/0185396 A1 | 6/2016 | Castillo et al. | |
| 2016/0221515 A1 | 8/2016 | Burd et al. | |

* cited by examiner

*Primary Examiner* — Joseph D. Pape
(74) *Attorney, Agent, or Firm* — Emerson Thomson Bennett, LLC; Daniel A. Thomson

(57) ABSTRACT

A shroud for a truck bed tailgate may have a set of platens adapted for engagement with a pick-up truck having truck bed, and a tailgate pivotable about a tailgate pivot axis. The set of platens may have a first platen adapted to be fixedly engaged with the truck bed, the first platen defining a hinge cover pivot axis parallel to the tailgate pivot axis. The shroud may further have a hinge cover, the hinge cover being rotatably engaged with the first platen to rotate about the hinge cover pivot axis between a first orientation wherein it extends over the elongated tailgate clearance gap, and a second orientation wherein it is clear of the tailgate when the tailgate is in the closed position.

20 Claims, 16 Drawing Sheets

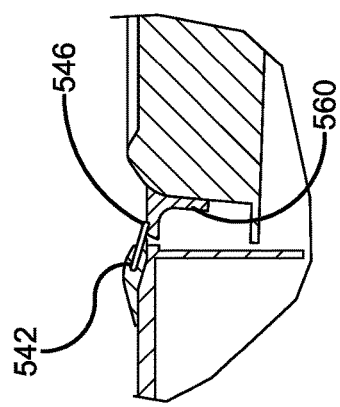
FIG. 6C
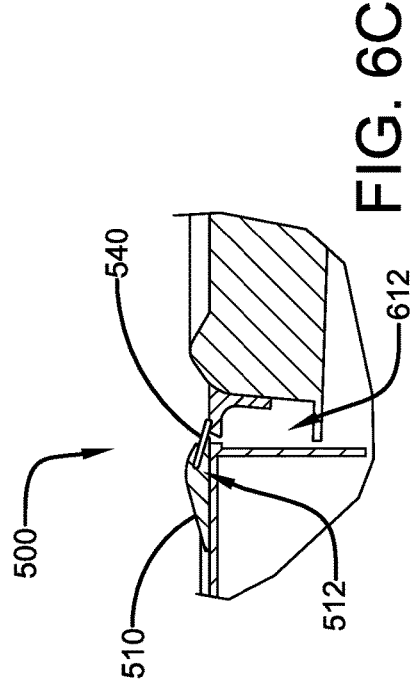
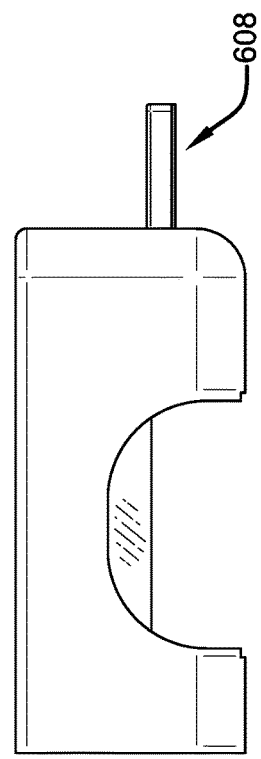
FIG. 6D
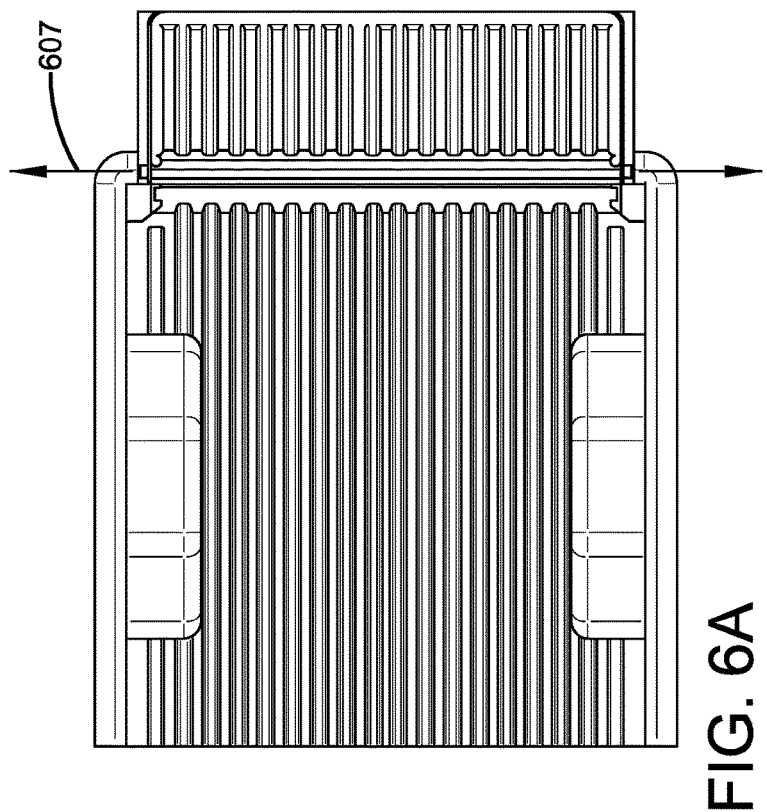
FIG. 6A
FIG. 6B

709

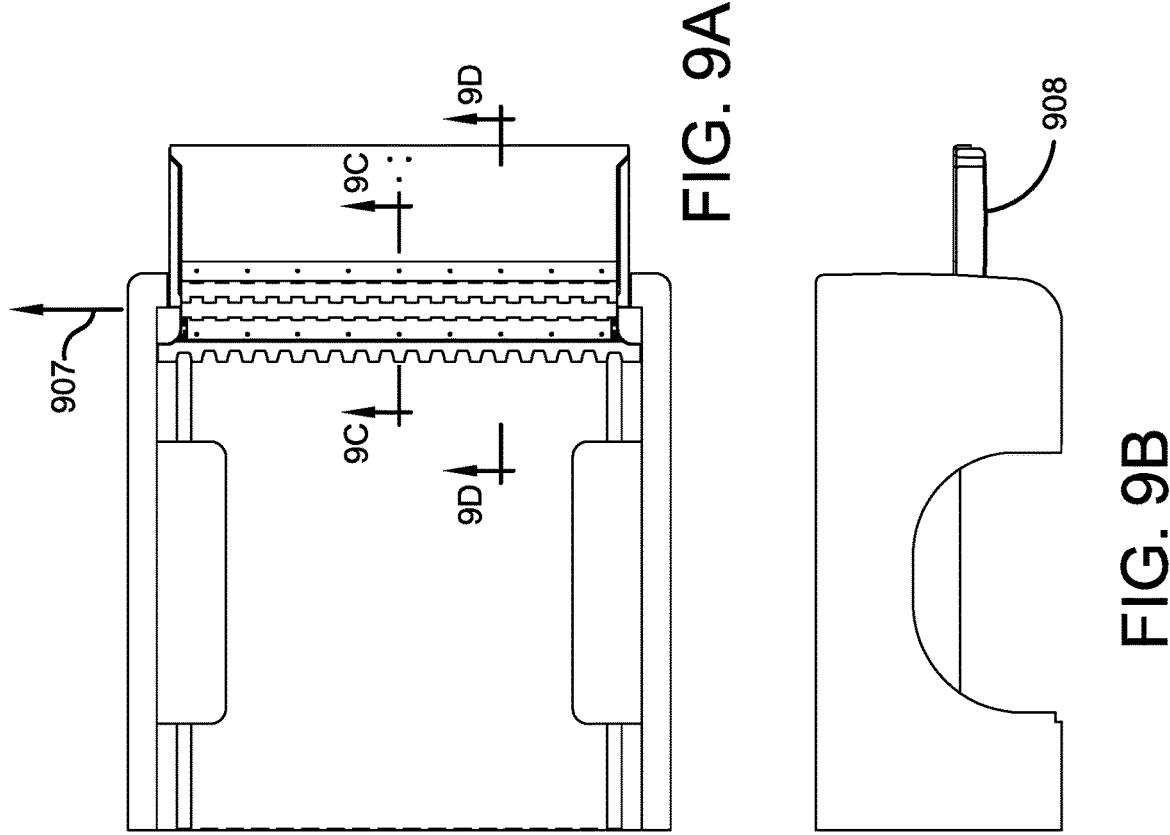

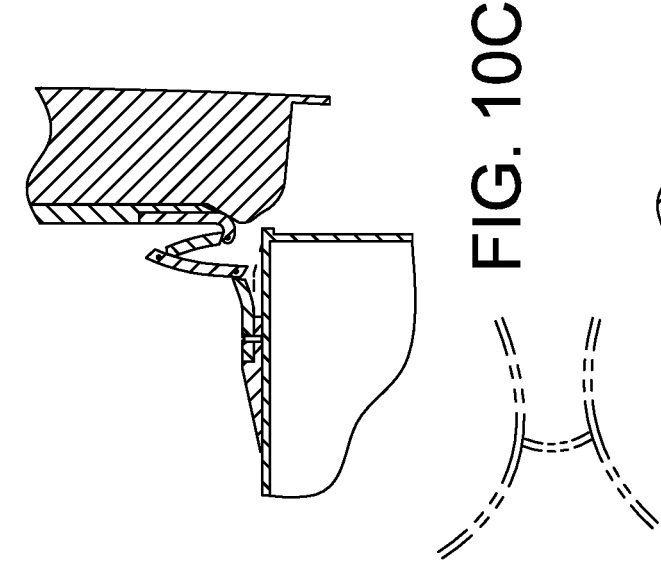
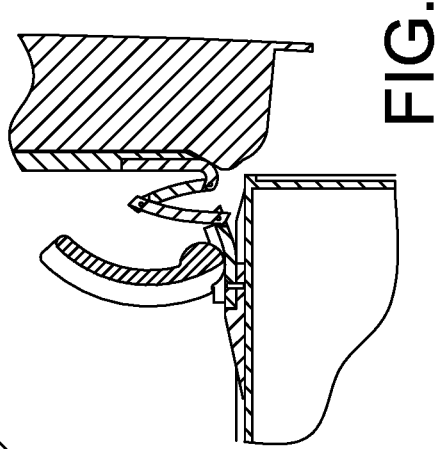
FIG. 10C
FIG. 10D
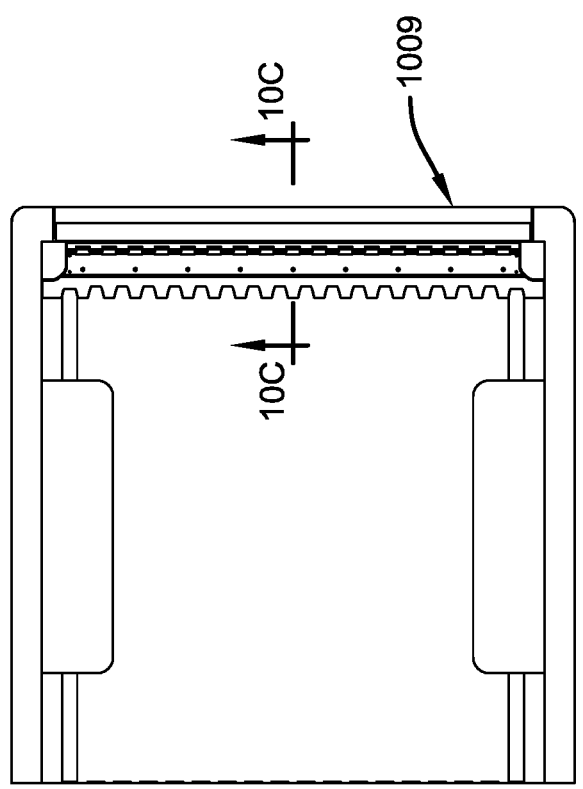
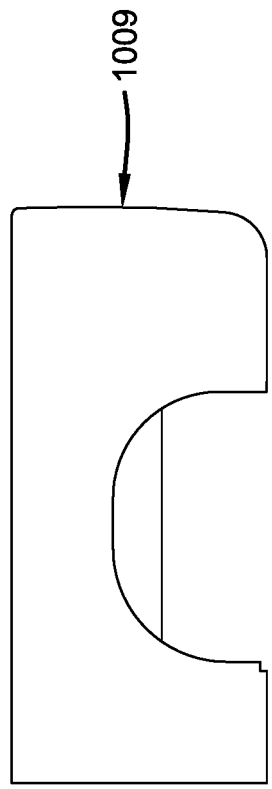
FIG. 10A
FIG. 10B

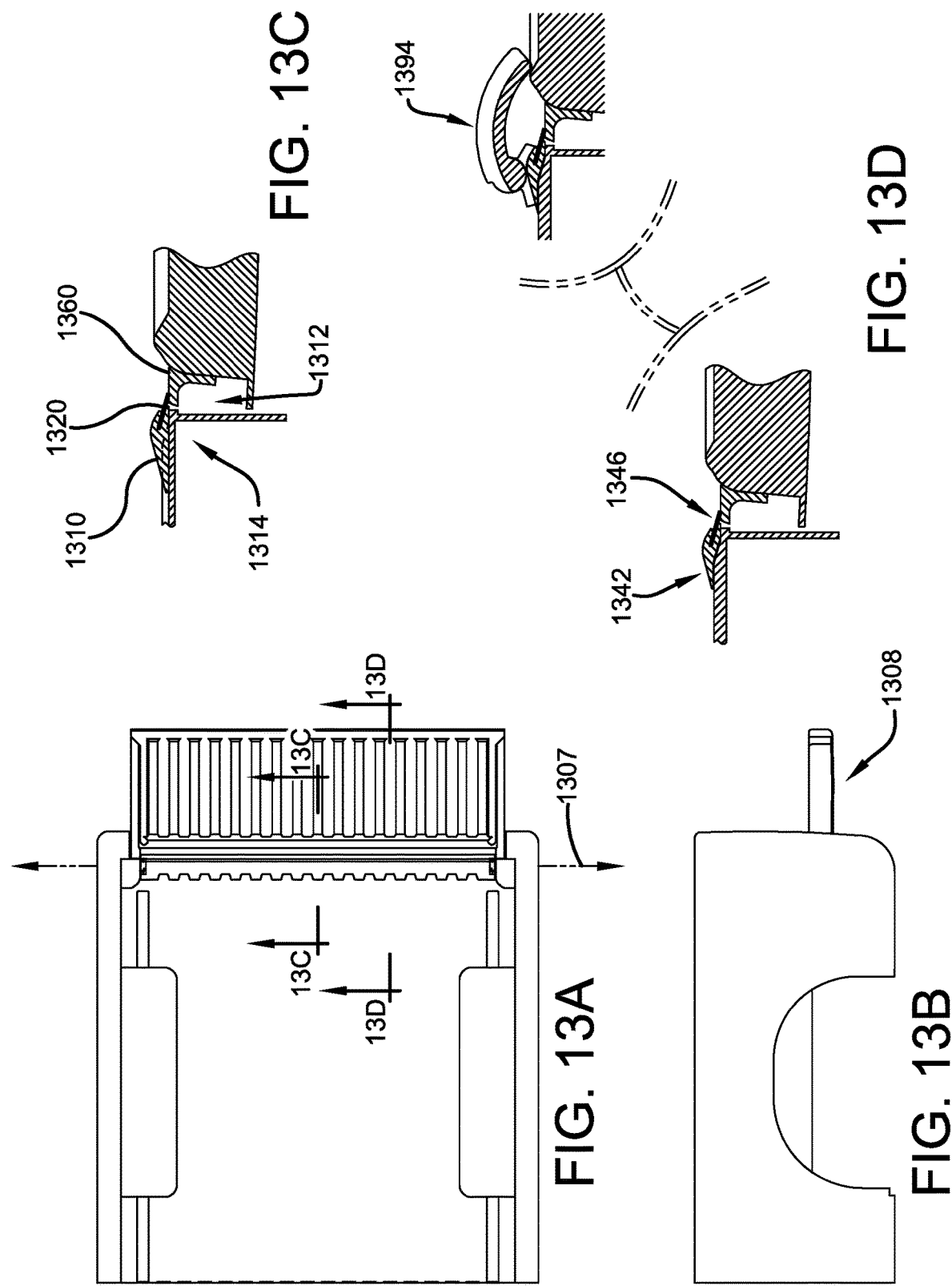

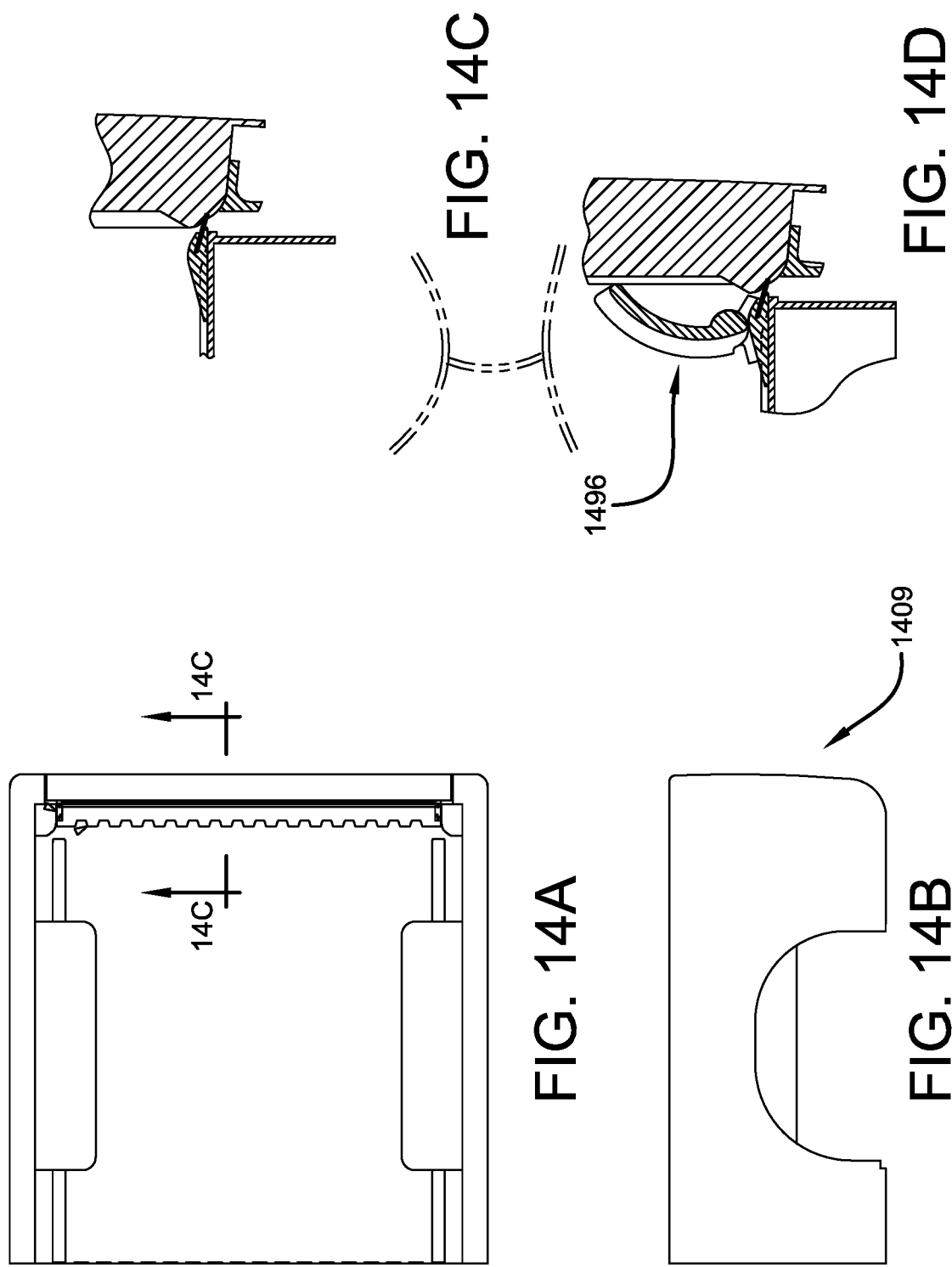

TAIL GATE SHROUD

CROSS-REFERENCE TO RELATED APPLICATIONS

This application is a continuation in part of application Ser. No. 15/888,311, filed Feb. 5, 2018, the entirety of which is fully incorporated by reference herein.

BACKGROUND

The present subject matter is directed to truck tailgates. More specifically, the present technology is directed to apparatuses and methods for shrouding a gap between a tailgate and a truck bed.

A pick-up truck typically comprises a tailgate hingedly connected to a truck bed and adapted to be moved between a closed position and an open position. One common form of tailgate is substantially upright and latchable when closed and is substantially flat when open. Such common tailgates form a gap between the truck bed and the tailgate when the tailgate is in the open position.

It remains desirable to provide a substantially rigid shroud which is adapted to cover all or part of the tailgate gap and to adjust to accommodate the changeable position of the tailgate.

SUMMARY

Provided is a shroud for a truck bed tailgate comprising a set of platens adapted for engagement with an associated pick-up truck and a hinge cover. The associated pick-up truck has a truck bed of some width W, a tailgate engaged with the truck bed to pivot about a tailgate pivot axis between an open position, and a closed position, and when the tailgate is in the open position, an elongated tailgate clearance gap between the truck bed and the tailgate extending parallel to the tailgate pivot axis. The set of platens has a first platen adapted to be fixedly engaged with the truck bed, the first platen defining a hinge cover pivot axis parallel to the tailgate pivot axis, and offset from the tailgate pivot axis, and one or more additional platens. The hinge cover may be elongated in a first direction to define a proximate end and a distal end opposite the proximate end, the proximate end being rotatably engaged with the first platen to rotate about the hinge cover pivot axis, and the distal end being slidably engageable with the tailgate, when the tailgate is in the open position, when the tailgate in the closed position, and all positions therebetween. The hinge cover may be positioned to extend over the elongated tailgate clearance gap, when the tailgate is in the open position, when the tailgate in the closed position, and all positions therebetween.

Provided is a shroud for a truck bed tailgate may have a set of platens adapted for engagement with a pick-up truck having truck bed, and a tailgate pivotable about a tailgate pivot axis. The set of platens may have a first platen adapted to be fixedly engaged with the truck bed, the first platen defining a hinge cover pivot axis parallel to the tailgate pivot axis. The shroud may further have a hinge cover, the hinge cover being rotatably engaged with the first platen to rotate about the hinge cover pivot axis between a first orientation wherein it extends over the elongated tailgate clearance gap, and a second orientation wherein it is clear of the tailgate when the tailgate is in the closed position.

Still other benefits and advantages of the present subject matter will become apparent to those skilled in the art to which it pertains upon a reading and understanding of the following detailed specification.

BRIEF DESCRIPTION OF THE DRAWINGS

The present subject matter may take physical form in certain parts and arrangement of parts, embodiments of which will be described in detail in this specification and illustrated in the accompanying drawings which form a part hereof and wherein:

FIG. 6A is a top view of the second embodiment of a truck bed with a tailgate shroud with the tailgate in an open position.

FIG. 6B is a side view of the second embodiment of a truck bed with a tailgate shroud with the tailgate in an open position.

FIG. 6C is section view of the second embodiment of a truck bed with a tailgate shroud with the tailgate in an open position.

FIG. 6D is section view of the second embodiment of a truck bed with a tailgate shroud with the tailgate in an open position.

FIG. 9A is a top view of the third embodiment of a truck bed with a tailgate shroud with the tailgate in an open position.

FIG. 9B is a side view of the third embodiment of a truck bed with a tailgate shroud with the tailgate in an open position.

FIG. 9C is section view of the third embodiment of a truck bed with a tailgate shroud with the tailgate in an open position.

FIG. 9D is section view of the third embodiment of a truck bed with a tailgate shroud with the tailgate in an open position.

FIG. 10A is a top view of the third embodiment of a truck bed with a tailgate shroud with the tailgate in a closed position.

FIG. 10B is a side view of the third embodiment of a truck bed with a tailgate shroud with the tailgate in a closed position.

FIG. 10C is section view of the third embodiment of a truck bed with a tailgate shroud with the tailgate in a closed position.

FIG. 10D is section view of the third embodiment of a truck bed with a tailgate shroud with the tailgate in a closed position.

FIG. 13A is a top view of the fourth embodiment of a truck bed with a tailgate shroud with the tailgate in an open position.

FIG. 13B is a side view of the fourth embodiment of a truck bed with a tailgate shroud with the tailgate in an open position.

FIG. 13C is section view of the fourth embodiment of a truck bed with a tailgate shroud with the tailgate in an open position.

FIG. 13D is section view of the fourth embodiment of a truck bed with a tailgate shroud with the tailgate in an open position.

FIG. 14A is a top view of the fourth embodiment of a truck bed with a tailgate shroud with the tailgate in a closed position.

FIG. 14B is a side view of the fourth embodiment of a truck bed with a tailgate shroud with the tailgate in a closed position.

FIG. 14C is section view of the fourth embodiment of a truck bed with a tailgate shroud with the tailgate in a closed position.

FIG. 14D is section view of the fourth embodiment of a truck bed with a tailgate shroud with the tailgate in a closed position.

DETAILED DESCRIPTION

Figure 1:
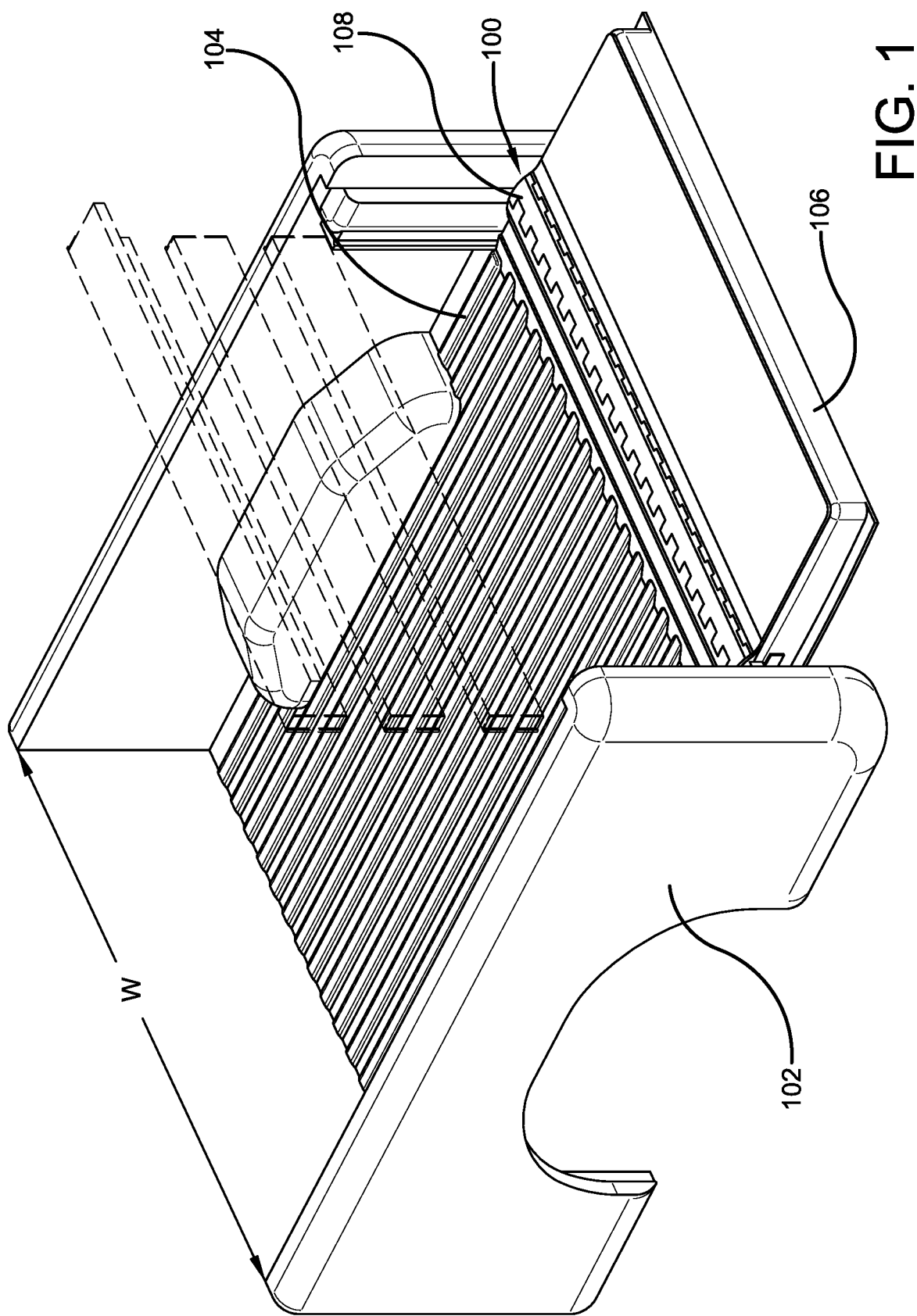
FIG. 1 is an axonometric view of a first embodiment of a truck bed with a tailgate shroud.

Referring now to the drawings wherein the showings are for purposes of illustrating embodiments of the present subject matter only and not for purposes of limiting the same, and wherein like reference numerals are understood to refer to like components, provided is a tailgate shroud.

In the non limiting embodiment shown in FIGS. 1-4, a tailgate shroud 100 for a truck bed tailgate may comprise a set of platens 430 adapted for engagement as a four-bar linkage 108 with an associated pick-up truck 102. The associated pick-up truck 102 has a truck bed 104 of some width W, and a tailgate 106 engaged with the truck bed 104 to pivot about a tailgate pivot axis 207 continuously between an open position 208, and a closed position 309. When the tailgate 106 is in the open position 208, an elongated tailgate clearance gap 212 is formed extending parallel to the tailgate pivot axis 207.

Figure 2A:
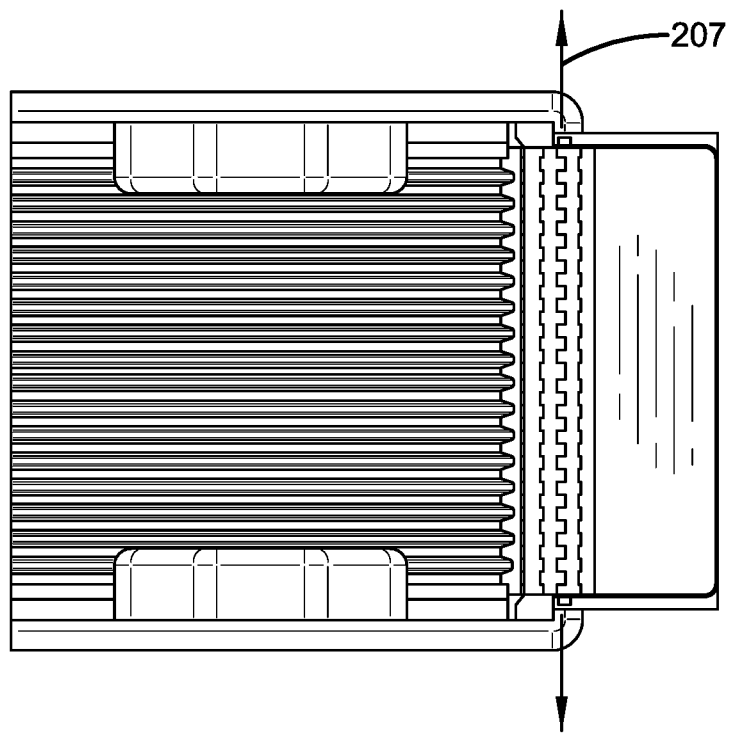
FIG. 2A is a top view of the first embodiment of a truck bed with a tailgate shroud with the tailgate in an open position.
Figure 2B:
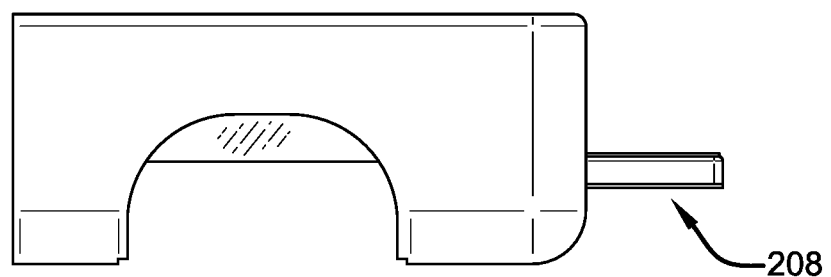
FIG. 2B is a side view of the first embodiment of a truck bed with a tailgate shroud with the tailgate in an open position.
Figure 2C:
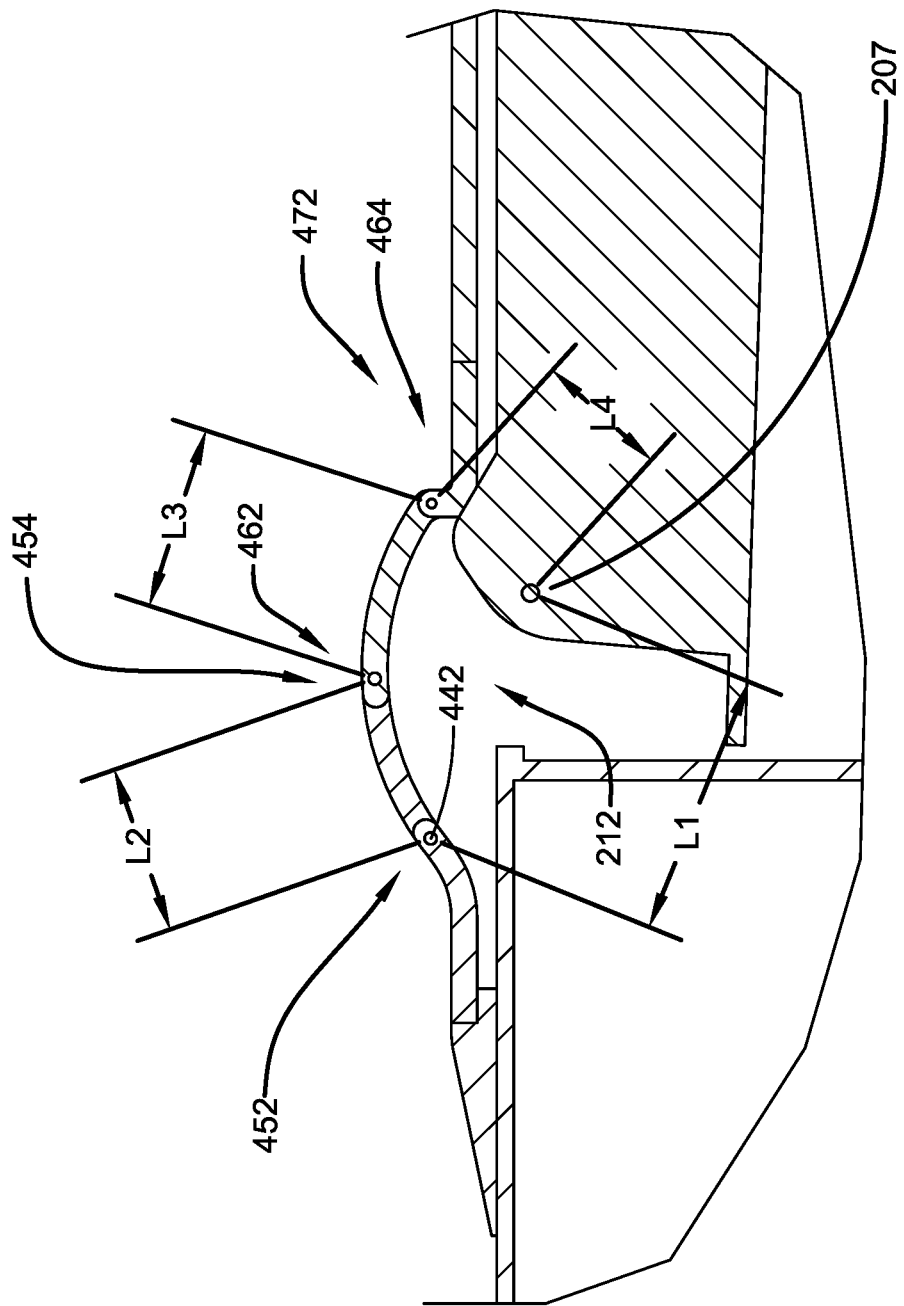
FIG. 2C is section view of the first embodiment of a truck bed with a tailgate shroud with the tailgate in an open position.
Figure 2D:
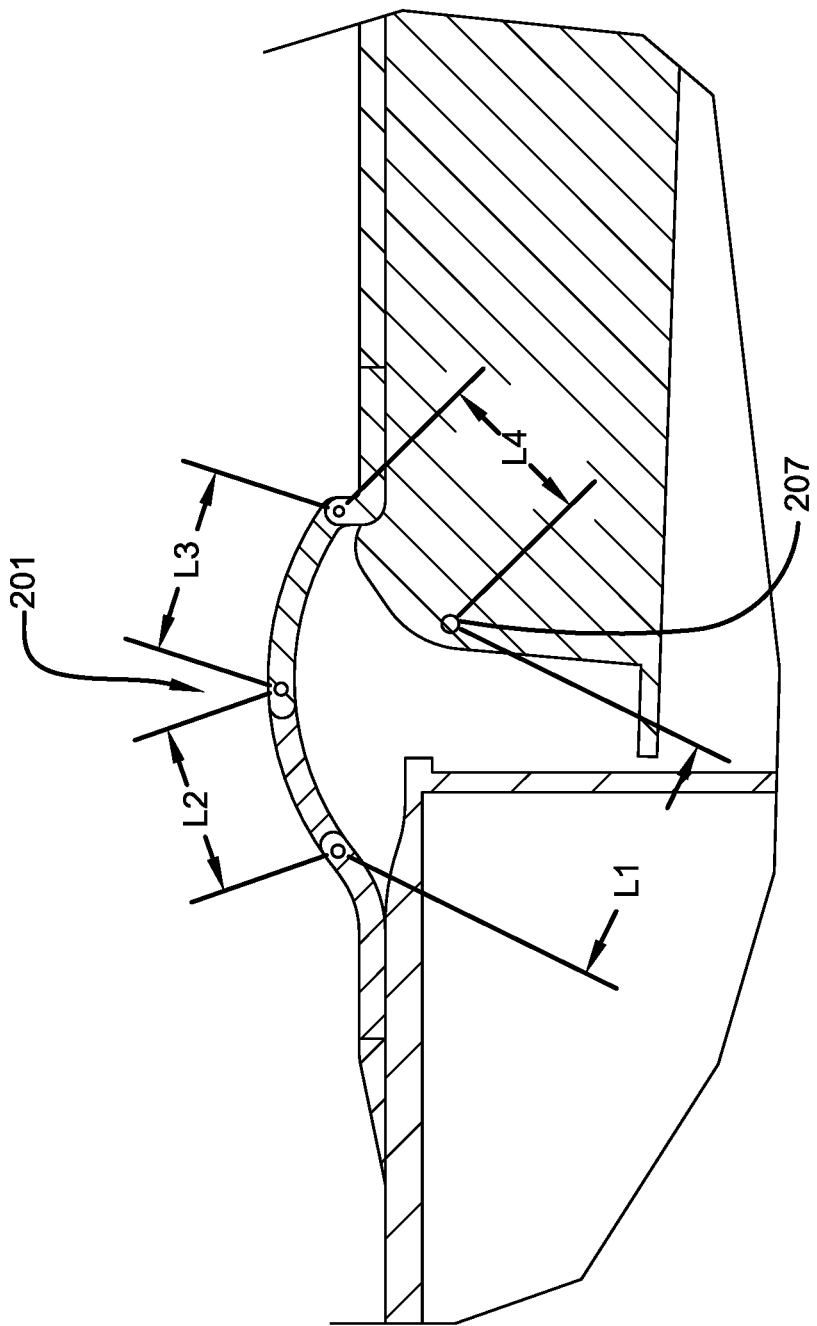
FIG. 2D is section view of the first embodiment of a truck bed with a tailgate shroud with the tailgate in an open position.
Figure 3D:
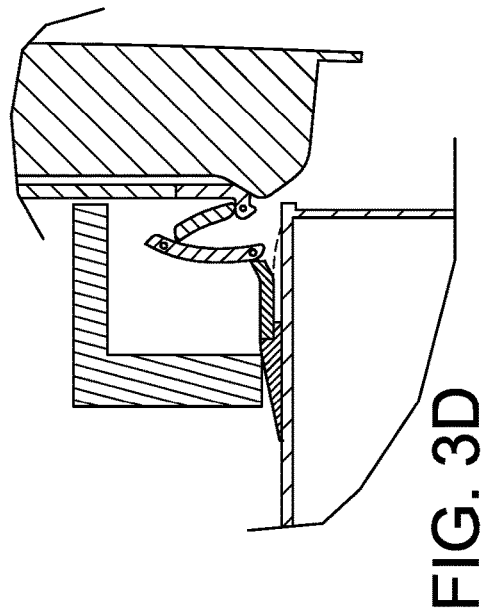
FIG. 3D is section view of the first embodiment of a truck bed with a tailgate shroud with the tailgate in a closed position.
Figure 3C:
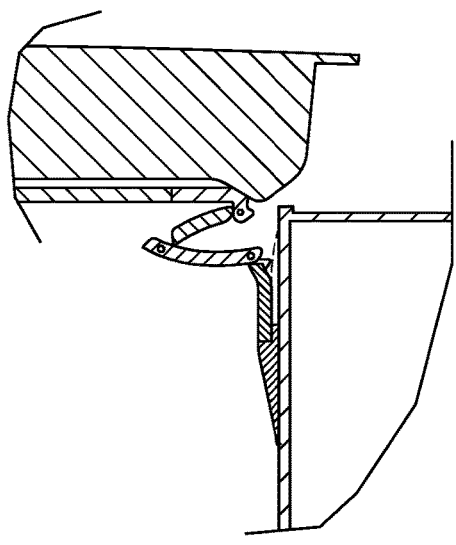
FIG. 3C is section view of the first embodiment of a truck bed with a tailgate shroud with the tailgate in a closed position.
Figure 3A:
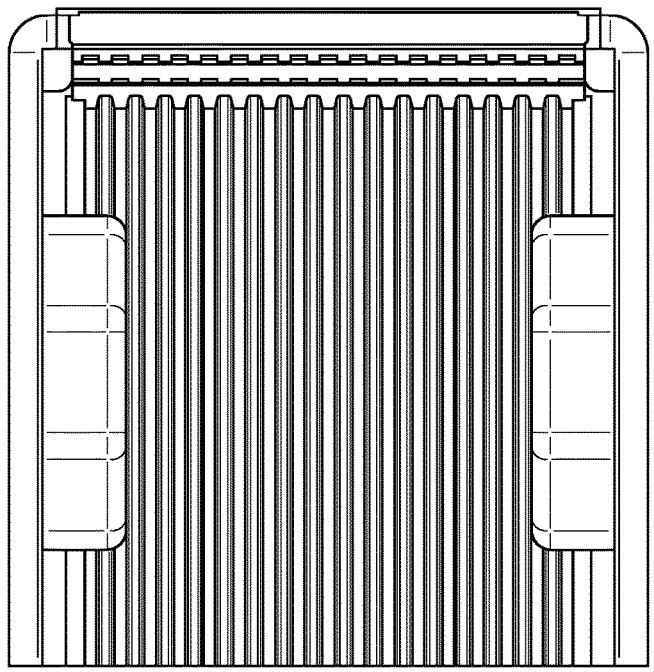
FIG. 3A is a top view of the first embodiment of a truck bed with a tailgate shroud with the tailgate in a closed position.
Figure 3B:
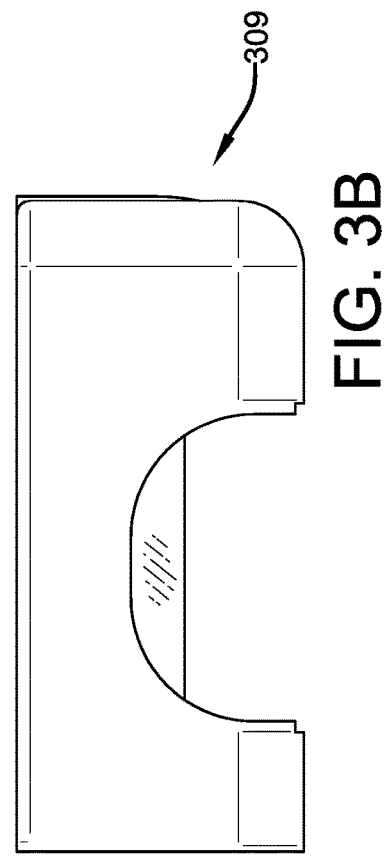
FIG. 3B is a side view of the first embodiment of a truck bed with a tailgate shroud with the tailgate in a closed position.
Figure 4:
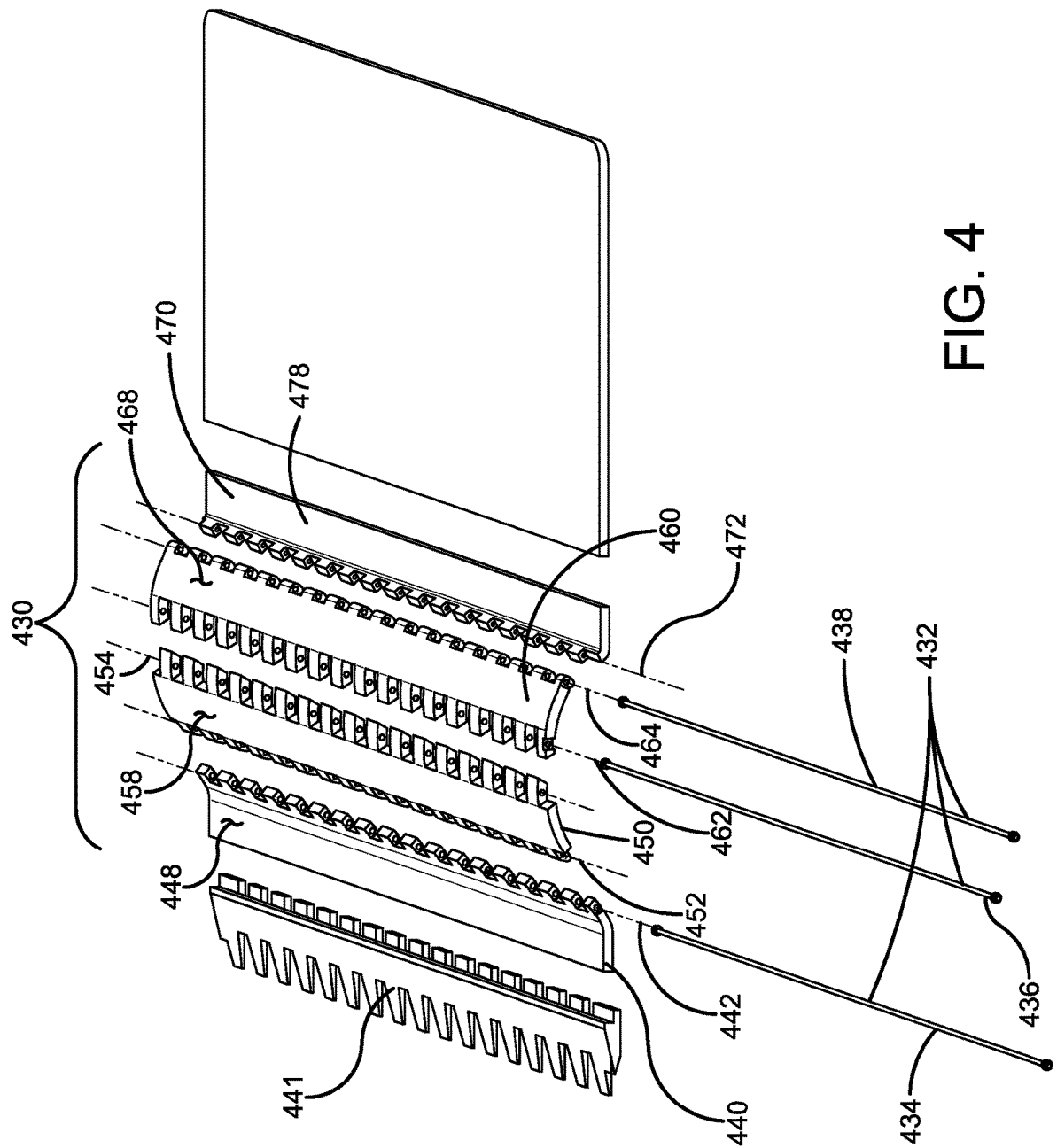
FIG. 4 is an view of the unassembled components that are part of one embodiment of a four bar mechanism for the first embodiment of a tailgate shroud.
Figure 5:
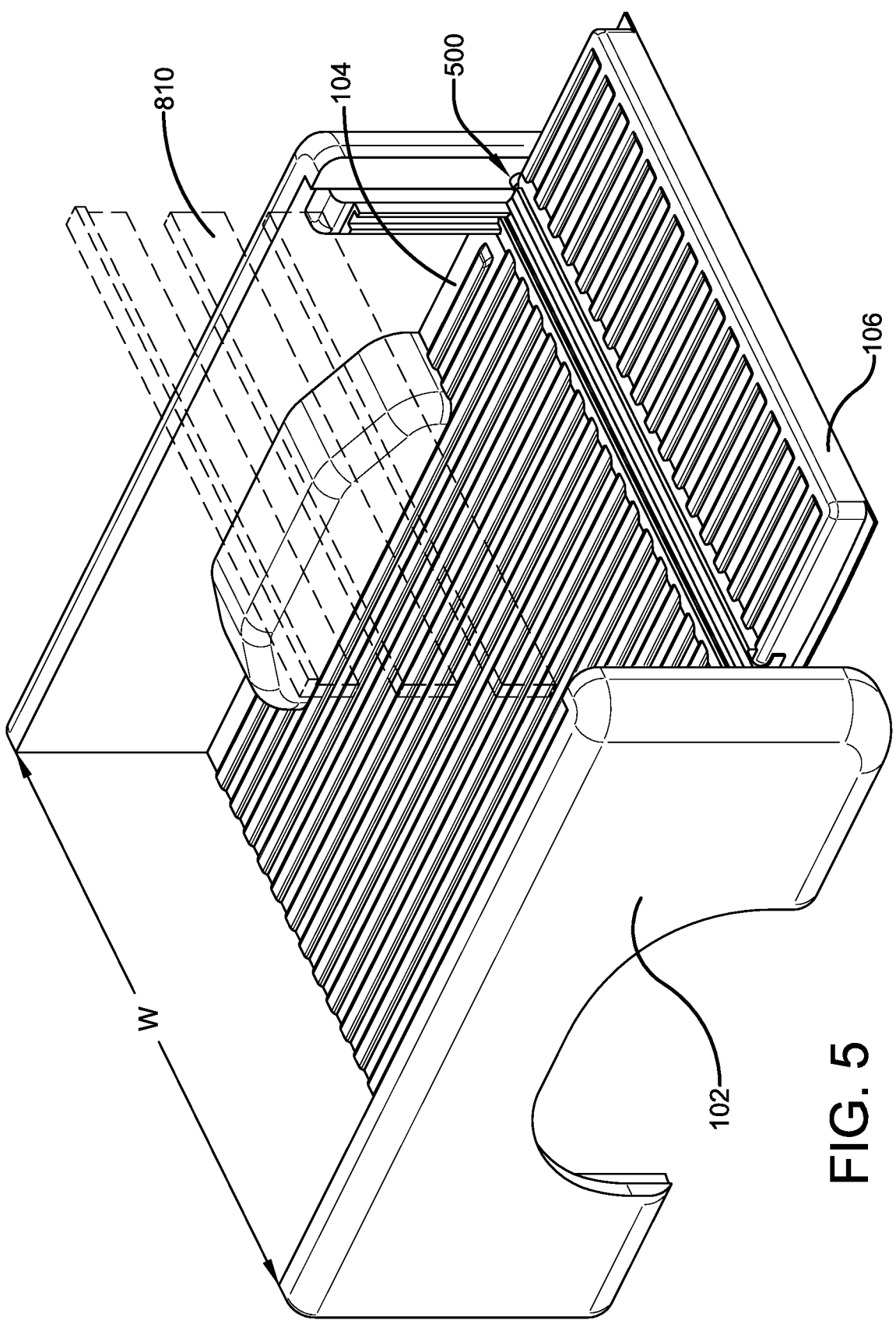
FIG. 5 is an axonometric view of a second embodiment of a truck bed with a tailgate shroud.
Figure 7C:
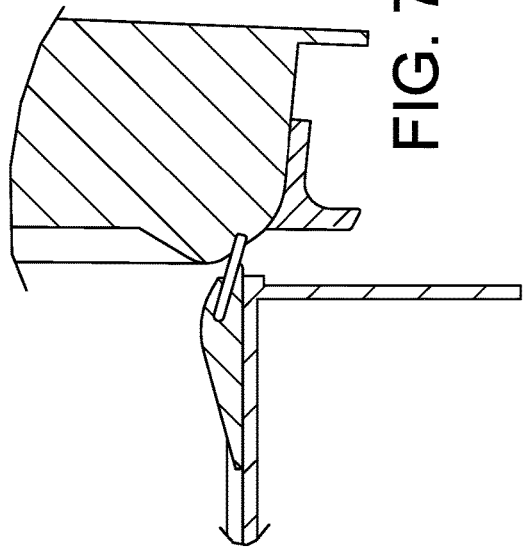
FIG. 7C is section view of the second embodiment of a truck bed with a tailgate shroud with the tailgate in a closed position.
Figure 7D:
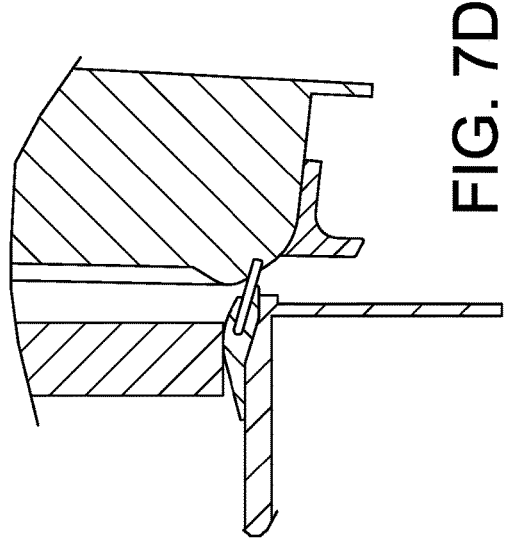
FIG. 7D is section view of the second embodiment of a truck bed with a tailgate shroud with the tailgate in a closed position.
Figure 7A:
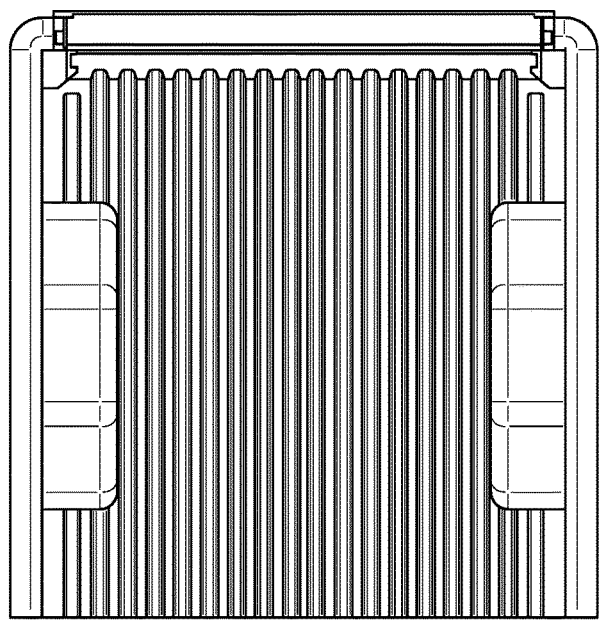
FIG. 7A is a top view of the second embodiment of a truck bed with a tailgate shroud with the tailgate in a closed position.
Figure 7B:
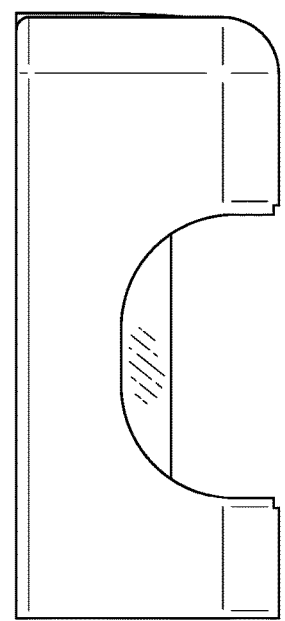
FIG. 7B is a side view of the second embodiment of a truck bed with a tailgate shroud with the tailgate in a closed position.
Figure 8:
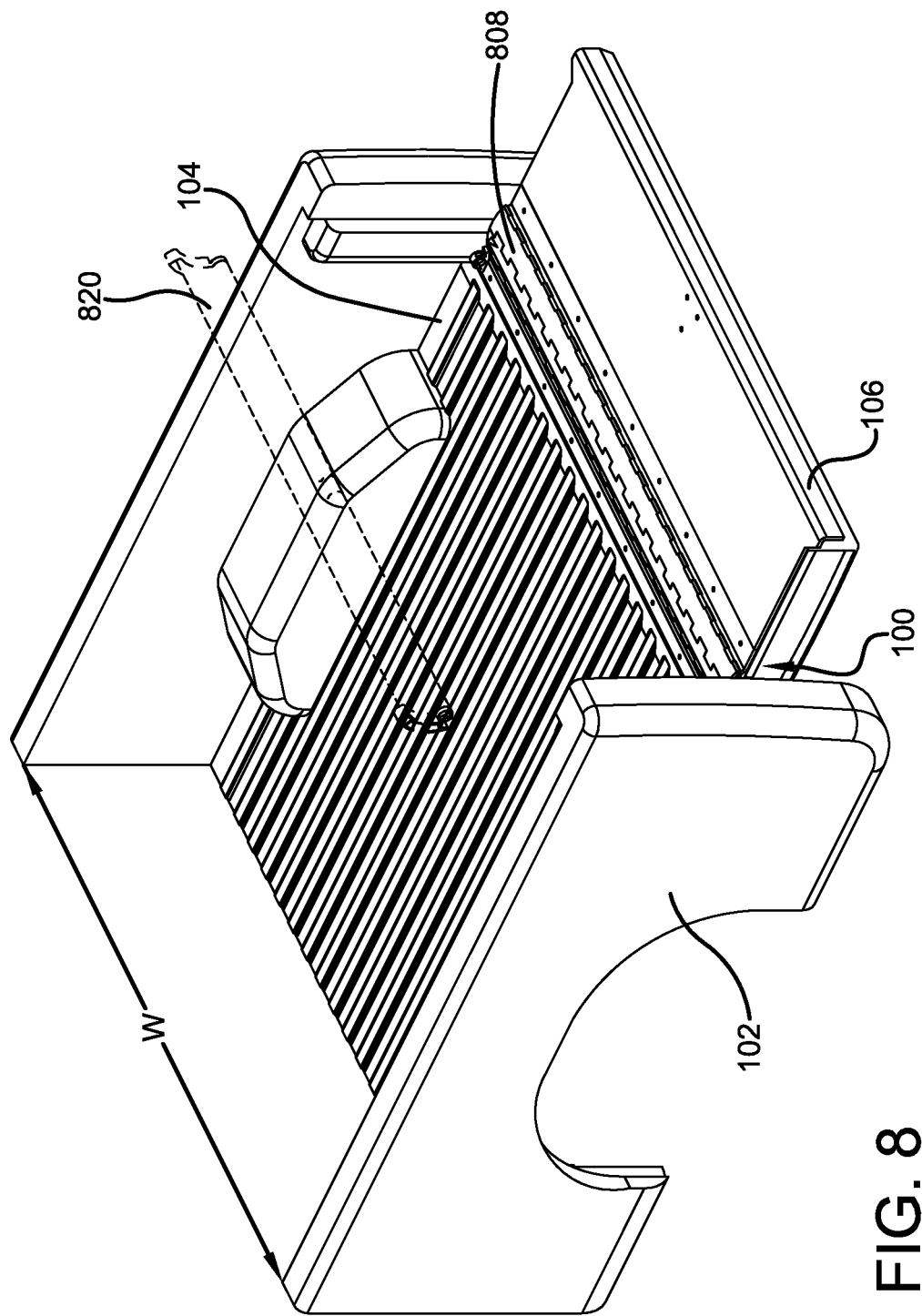
FIG. 8 is an axonometric view of a third embodiment of a truck bed with a tailgate shroud.
Figure 11:
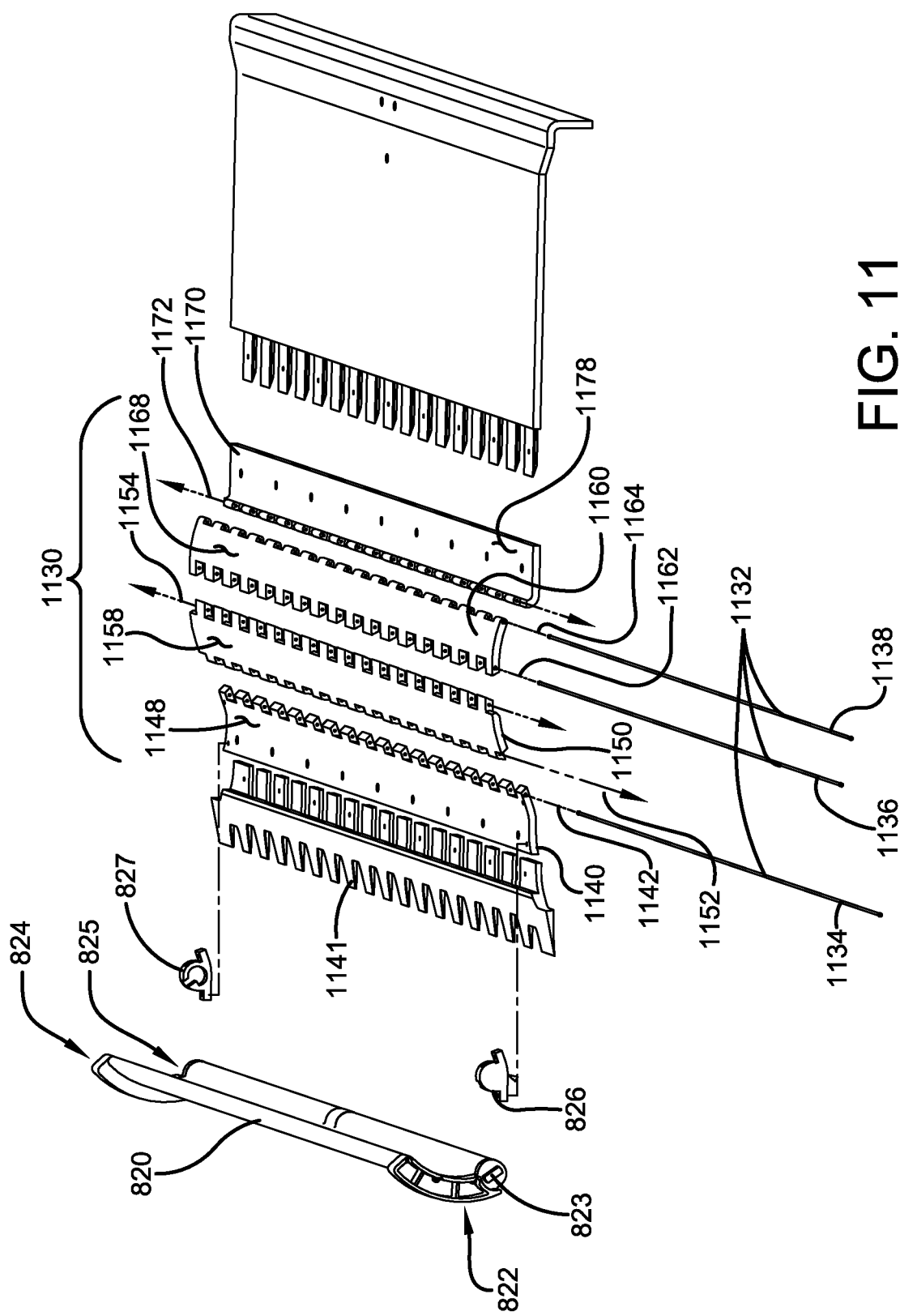
FIG. 11 is an view of the unassembled components that are part of one embodiment of a four bar mechanism for the third embodiment of a tailgate shroud.
Figure 12:
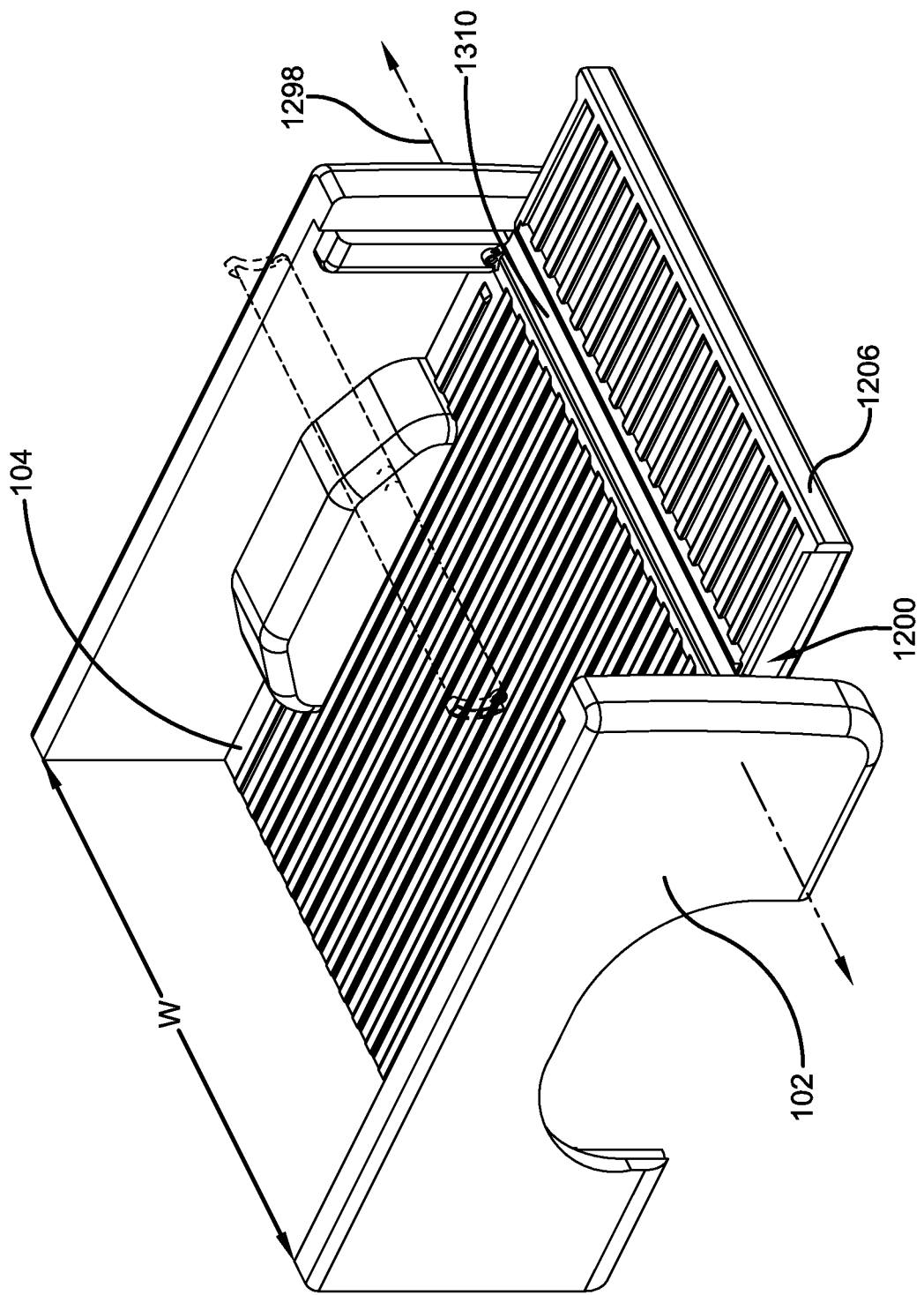
FIG. 12 is an axonometric view of a fourth embodiment of a truck bed with a tailgate shroud.

The set of platens 430 may comprise a first platen 440, a second platen 450, third platen 460, and a fourth platen 470. The set of platens may be engaged with a truck bed 104, a tailgate 106, and to one another to form a four bar linkage 108 operable to shroud the tailgate gap 212 as shown in FIGS. 2C and 2D. In some embodiments, the set of platens may be pivotably engaged to one another by a set of pivot shafts 432.

The first platen 440 may define a first pivot axis 442, the first platen 440 being adapted to be fixedly engaged with the truck bed 104 with the first pivot axis 442 parallel to the tailgate pivot axis 207 and offset from the tailgate pivot axis 207 by a distance L1. The first platen 440 may define a first surface 448.

The second platen 450 may define a second pivot axis 452 and a third pivot axis 454 parallel to the second pivot axis 452 and offset from the second pivot axis 452 by a distance L2. The second platen 450 may be engaged or may be adapted to be engaged to the first platen 440 such that the second pivot axis 452 and the first pivot axis 442 coincide and the second platen 450 is pivotable about first pivot axis 442. The second platen may define a second surface 458

The third platen 460 may define a fourth pivot axis 462 and a fifth pivot axis 464 parallel to the fourth pivot axis 462 and offset from the fourth pivot axis 462 by a distance L3. The third platen 460 being adapted to be engaged to the second platen 450 such that the fourth pivot axis 462 and the third pivot axis 454 coincide and the third platen 460 is pivotable about third pivot axis 454. The third platen 460 may define a third surface 468.

The fourth platen 470 may define a sixth pivot axis 472, the fourth platen 470 fixedly engaged or being adapted to be fixedly engaged with the tailgate 106 with the sixth pivot axis 472 parallel to the tailgate pivot axis 207 and offset from the tailgate pivot axis 207 by a distance L4. The fourth platen 470 may be engaged or may be adapted to be engaged to the third platen 460 such that the sixth pivot axis 472 and the fifth pivot axis 464 coincide with the fourth platen 470 being pivotable about the fifth pivot axis 464 as well as being pivotable about the tailgate pivot axis 207. The fourth platen 470 may define a fourth surface 478. It should be understood that the distances L1, L2, L3, and L4 each define the length of the respective links. Accordingly, herein, unless otherwise noted: length L1 is interchangeable with distance L1; length L2 is interchangeable with distance L2; length L3 is interchangeable with distance L3; and length L4 is interchangeable with distance L4. These lengths L1, L2, L3, and L4 are shown with pairs of external dimension lines in FIGS. 2C and 2D.

When engaged to form a four bar linkage 108, the linkage performance is a function of the link lengths, L1, L2, L3, L4. For analysis purposes it should be understood that the links can be ordered from shortest link, S, to longest link L, where there other two links are of intermediate length P and Q. For analysis purposes where one of more links are of the same length they can be interchangeably assigned their order in the ordered from shortest link, S, to longest link L such that there is always a shortest link of length S and a longest link of length L, and two links are of intermediate length P and Q. Four bar linkages may be analyzed to determine whether or not they satisfy the Grashof condition. The Grashof condition for a four-bar linkage states: if the sum of the shortest and longest link of a planar quadrilateral linkage is less than or equal to the sum of the remaining two links, then the shortest link can rotate fully with respect to a neighboring link. That is, the Grashof condition is satisfied if S+L≤P+Q. In some embodiments, the linkage 108 does not satisfy the Grashof condition.

It should be understood that, unless otherwise noted, ranges recited herein are not inclusive of their recited endpoints.

In some embodiments, the tailgate closed position 309 is a 90 degree rotation about the tailgate pivot axis 207 from the tailgate open position 208. It is acceptable in some embodiments that the tailgate closed position 309 is a .gamma. degree rotation about the tailgate pivot axis 207 from the tailgate open position 208, where .gamma. is between 45 and 180 degrees, or where .gamma. is between 75 and 105 degrees, or where .gamma. is between 85 and 95 degrees.

In some embodiments, the relationship of the lengths of the link lengths, L1, L2, L3, and L4 is such that L1+L3−L2−L4 is positive; L1+L4−L2−L3 is positive; and L3+L4−L2−L1 is negative. In such an embodiment, the input link, the link with length L2 may be a 0-Rocker and the output link, the link with length L4, may be a π-Rocker.

In some embodiments the relationship of the lengths of the link lengths, L1, L2, L3, and L4 is such that L2/L1 is between 0.6 and 0.8; and L3/L1 is between 0.6 and 0.8; and L4/L1 is between 0.6 and 0.8. In some embodiments the relationship of the lengths of the link lengths, L1, L2, L3, and L4 is such that L2/L1 is between 0.65 and 0.75 inclusive; and L3/L1 is between 0.65 and 0.75 inclusive; and L4/L1 is between 0.65 and 0.75 inclusive. In some embodiments the relationship of the lengths of the link lengths, L1, L2, L3, and L4 is such that L2/L1 is between 0.68 and 0.72 inclusive; L3/L1 is between 0.68 and 0.72 inclusive; and L4/L1 is between 0.68 and 0.72 inclusive.

In some embodiments the linkage 108 is such that when the tailgate 106 is in the open position 208, the first surface 448, the second surface 458, and the third surface 468 form a continuous smooth surface 201. As used herein the term smooth continuous smooth surface refers to a surface that lack discontinuities, the slope of the surface 201 (as measured in a cross section perpendicular to the tailgate pivot axis as shown in FIGS. 2C and 2D) is the same or substantially the same as measured on either side of any given point.

In some embodiments, the first platen is elongated to extend at least a width of 0.9W in a direction parallel to the tailgate pivot axis 207. In some embodiments, the second platen is elongated to extend at least a width of 0.9W in a direction parallel to the tailgate pivot axis 207. In some embodiments, the third platen is elongated to extend at least a width of 0.9W in a direction parallel to the tailgate pivot axis 207. In some embodiments, the forth platen is elongated to extend at least a width of 0.9W in a direction parallel to the tailgate pivot axis 207. In some embodiments, each platen is elongated to extend at least a width of 0.9W in a direction parallel to the tailgate pivot axis 207.

As shown in FIGS. 1-4 in one non limiting embodiment a linkage 108 may be formed. The first platen 440 may be fixedly engaged to a truck bed 104 either directly or by engagement to an intermediate platen 441. The truck bed 104 is pivotably connected to a tailgate 106 along a tailgate pivot axis 207. The first platen 440 is pivotably engaged to the second platen 450 by a first pivot shaft 434 extending along coincident axes 442 and 452. The second platen 450 is pivotably engaged to the third platen 460 by a second pivot shaft 436 extending along coincident axes 454 and 462. The third platen 460 is pivotably engaged to the fourth platen 470 by a third pivot shaft 438 extending along coincident axes 464 and 472. The fourth platen 470 may be fixedly engaged to the tailgate 106 and may be pivotable with the tailgate 106 about the tailgate pivot axis 207. The linkage 108 may be considered to have a ground link of length L1 extending between the first pivot shaft 434 and the tailgate pivot axis 207; an input link of length L2 extending between the first pivot shaft 434 and the second pivot shaft 436; a coupler link of length L3 extending between the second pivot shaft 436 and the third pivot shaft 438; and an output link of length L4 extending between the third pivot shaft 438 and the tailgate pivot axis 207.

In the non limiting embodiment shown in FIGS. 5-7D, a tailgate shroud 500 for a truck bed tailgate may comprise an elastomeric strap 540 adapted for engagement with an associated pick-up truck 102. The associated pick-up truck 102 has a truck bed 104 of some width W, and a tailgate 106 engaged with the truck bed 104 to pivot about a tailgate pivot axis 607 continuously between an open position 608, and a closed position 709. When the tailgate 106 is in the open position 608, an elongated tailgate clearance gap 612 is formed extending parallel to the tailgate pivot axis 607.

In one non-limiting embodiment the tailgate shroud 500 may comprise a first rigid platen 510, an elastomeric strap 540, and a second rigid platen 560. The first rigid platen 510 may be fixedly engaged with the truck bed 104 and may be adapted to operationally engage the elastomeric strap 540. In one non-limiting embodiment, the elastomeric strap 540 has a first edge 542 and a second edge 546 which is free to flex with respect to the first edge 542 as the elastomeric material of the strap 540 flexes. In one non-limiting embodiment, the second rigid platen 560 may be fixedly engaged with the tailgate 106 and may be adapted to operationally engage the elastomeric strap 540.

In the non limiting embodiment shown in FIGS. 5-7D, the first rigid platen 510 provides a surface, or cavity, or other receptacle 512 elongated and extending parallel to the tailgate pivot axis 607. The receptacle 512 is fixedly engaged with the truck bed 104 and the receptacle 512 is adapted to receive and hold the first edge 542 of elastomeric strap 540 while permitting the second edge 546 of the elastomeric strap 540 to be free to flex with respect to the first edge 542 of elastomeric strap 540. The second edge 546 of the elastomeric strap 540 is movable with respect to both the first edge 542 of elastomeric strap 540 and to the second rigid platen 560. When the tailgate 106 is in the open position 608, the second edge 546 of the elastomeric strap 540 extends from the first rigid platen 510 across the tailgate clearance gap 612 to the second rigid platen 560, thereby closing the tailgate clearance gap 612. When the tailgate 106 is moved between the open position 608 and the closed position 709 the elastomeric strap 540 flexes sufficiently to provide freedom of motion without harm to the functionality of the tailgate shroud 500 or the associated pick-up truck 102.

As shown in FIGS. 1-7D, a tailgate shroud may be used in in conjunction with one or more removable panels 810.

In the non limiting embodiment shown in FIGS. 8-11, a tailgate shroud 800 for a truck bed tailgate may comprise a set of platens 1130 adapted for engagement as a four-bar linkage 808 with an associated pick-up truck 102. In this embodiment, the tailgate shroud may be used in in conjunction with a hinge cover 820. The associated pick-up truck 102 has a truck bed 104 of some width W, and a tailgate 106 engaged with the truck bed 104 to pivot about a tailgate pivot axis 907 continuously between an open position 908, and a closed position 1009. When the tailgate 806 is in the open position 908, an elongated tailgate clearance gap 912 is formed extending parallel to the tailgate pivot axis 907.

The set of platens 1130 may comprise a first platen 1140, a second platen 1150, third platen 1160, and a fourth platen 1170. The set of platens 1130 may be engaged with a truck bed 104, a tailgate 806, and to one another to form a four bar linkage 808 operable to shroud the tailgate clearance gap 912 as shown in FIGS. 2C and 2D. In some embodiments, the set of platens may be pivotably engaged to one another by a set of pivot shafts 1132.

The first platen 1140 may define a first pivot axis 1142, the first platen 1140 being adapted to be fixedly engaged with the truck bed 104 with the first pivot axis 1142 parallel to the tailgate pivot axis 907 and offset from the tailgate pivot axis 907 by a distance L1. The first platen 1140 may define a first surface 1148.

The second platen 1150 may define a second pivot axis 1152 and a third pivot axis 1154 parallel to the second pivot axis 1152 and offset from the second pivot axis 1152 by a distance L2. The second platen 1150 may be engaged or may be adapted to be engaged to the first platen 1140 such that the second pivot axis 1152 and the first pivot axis 1142 coincide and the second platen 1150 is pivotable about first pivot axis 1142. The second platen may define a second surface 1158.

The third platen 1160 may define a fourth pivot axis 1162 and a fifth pivot axis 1164 parallel to the fourth pivot axis 1162 and offset from the fourth pivot axis 1162 by a distance L3. The third platen 1160 being adapted to be engaged to the second platen 1150 such that the fourth pivot axis 1162 and the third pivot axis 1154 coincide and the third platen 1160 is pivotable about third pivot axis 1154. The third platen 1160 may define a third surface 1168.

The fourth platen 1170 may define a sixth pivot axis 1172, the fourth platen 1170 fixedly engaged or being adapted to be fixedly engaged with the tailgate 806 with the sixth pivot axis 1172 parallel to the tailgate pivot axis 907 and offset from the tailgate pivot axis 907 by a distance L4. The fourth platen 1170 may be engaged or may be adapted to be engaged to the third platen 1160 such that the sixth pivot axis 1172 and the fifth pivot axis 1164 coincide with the fourth platen 1170 being pivotable about the fifth pivot axis 1164 as well as being pivotable about the tailgate pivot axis 907. The fourth platen 1170 may define a fourth surface 1178. It should be understood that the distances L1, L2, L3, and L4 each define the length of the respective links. Accordingly, herein, unless otherwise noted: length L1 is interchangeable with distance L1; length L2 is interchangeable with distance L2; length L3 is interchangeable with distance L3; and length L4 is interchangeable with distance L4.

When engaged to form a four bar linkage 808, the linkage performance is a function of the link lengths, L1, L2, L3, L4. For analysis purposes it should be understood that the links can be ordered from shortest link, S, to longest link L, where there other two links are of intermediate length P and Q. For analysis purposes where one of more links are of the same length they can be interchangeably assigned their order in the ordered from shortest link, S, to longest link L such that there is always a shortest link of length S and a longest link of length L, and two links are of intermediate length P and Q. Four bar linkages may be analyzed to determine whether or not they satisfy the Grashof condition. The Grashof condition for a four-bar linkage states: if the sum of the shortest and longest link of a planar quadrilateral linkage is less than or equal to the sum of the remaining two links, then the shortest link can rotate fully with respect to a neighboring link. That is, the Grashof condition is satisfied if $S+L \leq P+Q$. In some embodiments, the linkage 808 does not satisfy the Grashof condition.

It should be understood that, unless otherwise noted, ranges recited herein are not inclusive of their recited endpoints.

In some embodiments, the tailgate closed position 1009 is a 90 degree rotation about the tailgate pivot axis 907 from the tailgate open position 908. It is acceptable in some embodiments that the tailgate closed position 1009 is a .gamma. degree rotation about the tailgate pivot axis 907 from the tailgate open position 908, where .gamma. is between 45 and 180 degrees, or where .gamma. is between 75 and 105 degrees, or where .gamma. is between 85 and 95 degrees.

In some embodiments, the relationship of the lengths of the link lengths, L1, L2, L3, and L4 is such that L1+L3−L2−L4 is positive; L1+L4−L2−L3 is positive; and L3+L4−L2−L1 is negative. In such an embodiment, the input link, the link with length L2 may be a 0-Rocker and the output link, the link with length L4, may be a π-Rocker.

In some embodiments the relationship of the lengths of the link lengths, L1, L2, L3, and L4 is such that L2/L1 is between 0.6 and 0.8; and L3/L1 is between 0.6 and 0.8; and L4/L1 is between 0.6 and 0.8. In some embodiments the relationship of the lengths of the link lengths, L1, L2, L3, and L4 is such that L2/L1 is between 0.65 and 0.75 inclusive; and L3/L1 is between 0.65 and 0.75 inclusive; and L4/L1 is between 0.65 and 0.75 inclusive. In some embodiments the relationship of the lengths of the link lengths, L1, L2, L3, and L4 is such that L2/L1 is between 0.68 and 0.72 inclusive; L3/L1 is between 0.68 and 0.72 inclusive; and L4/L1 is between 0.68 and 0.72 inclusive.

In some embodiments the linkage 808 is such that when the tailgate 806 is in the open position 908, the first surface 1148, the second surface 1158, and the third surface 1168 form a continuous smooth surface 901. As used herein the term smooth continuous smooth surface refers to a surface that lack discontinuities, the slope of the surface 901 (as measured in a cross section perpendicular to the tailgate pivot axis as shown in FIGS. 9C and 9D) is the same or substantially the same as measured on either side of any given point.

In some embodiments, the first platen 1140 is elongated to extend at least a width of 0.9W in a direction parallel to the tailgate pivot axis 907. In some embodiments, the second platen 1150 is elongated to extend at least a width of 0.9W in a direction parallel to the tailgate pivot axis 907. In some embodiments, the third platen 1160 is elongated to extend at least a width of 0.9W in a direction parallel to the tailgate pivot axis 907. In some embodiments, the forth platen 1170 is elongated to extend at least a width of 0.9W in a direction parallel to the tailgate pivot axis 907. In some embodiments, each platen is elongated to extend at least a width of 0.9W in a direction parallel to the tailgate pivot axis 907.

As shown in FIGS. 8-11D in one non limiting embodiment a linkage 808 may be formed. The first platen 1140 may be fixedly engaged to a truck bed 104 either directly or by engagement to an intermediate platen 1141. The truck bed 104 is pivotably connected to a tailgate 806 along a tailgate pivot axis 807. The first platen 1140 is pivotably engaged to the second platen 1150 by a first pivot shaft 1134 extending along coincident axes 1142 and 1152. The second platen 1150 is pivotably engaged to the third platen 1160 by a second pivot shaft 1136 extending along coincident axes 1154 and 1162. The third platen 1160 is pivotably engaged to the fourth platen 1170 by a third pivot shaft 1138 extending along coincident axes 1164 and 1172. The fourth platen 1170 may be fixedly engaged to the tailgate 806 and may be pivotable with the tailgate 806 about the tailgate pivot axis 907. The linkage 808 may be considered to have a ground link of length L1 extending between the first pivot shaft 1134 and the tailgate pivot axis 907; an input link of length L2 extending between the first pivot shaft 1134 and the second pivot shaft 1136; a coupler link of length L3 extending between the second pivot shaft 1136 and the third pivot shaft 1138; and an output link of length L4 extending between the third pivot shaft 1138 and the tailgate pivot axis 907.

In the non limiting embodiment shown in FIGS. 12-14D, a tailgate shroud 1200 for a truck bed tailgate 1206 may comprise an elastomeric strap 1320 adapted for engagement with an associated pick-up truck 102. The associated pick-up truck 102 has a truck bed 104 of some width W, and a tailgate 1206 engaged with the truck bed 104 to pivot about a tailgate pivot axis 1307 continuously between an open position 1308, and a closed position 1409. When the tailgate 1206 is in the open position 1308, an elongated tailgate clearance gap 1312 is formed extending parallel to the tailgate pivot axis 1307.

In one non-limiting embodiment the tailgate shroud 1200 may comprise a first platen 1310, an elastomeric strap 1320, and a second platen 1360. The first platen 1310 may be fixedly engaged with the truck bed 104 and may be adapted to operationally engage the elastomeric strap 1320. In one non-limiting embodiment, the elastomeric strap 1320 has a first edge 1342 fixedly engaged with the first platen and a second edge 1346 opposite the first edge which is free to flex with respect to the first edge 1342 as the elastomeric material of the strap 1340 flexes. In one non-limiting embodiment, the second platen 1360 may be fixedly engaged with the tailgate 806 and may be adapted to operationally engage the elastomeric strap 1340. In certain embodiments the second edge 1346 extends outwardly from the first platen 1310 toward the tailgate 806.

In the non limiting embodiment shown in FIGS. 12-14D, the first platen 1310 provides a surface, or cavity, or other receptacle 1314 elongated and extending parallel to the tailgate pivot axis 907. The receptacle 1314 is fixedly engaged with the truck bed 104 and the receptacle 1314 is adapted to receive and hold the first edge 1342 of elastomeric strap 1320 while permitting the second edge 1346 of the elastomeric strap 540 to be free to flex with respect to the first edge 1342 of elastomeric strap 1320. The second edge 1346 of the elastomeric strap 1320 is movable with respect to both the first edge 1342 of elastomeric strap 1320 and to the second platen 1360. When the tailgate 1206 is in the open position 1308, the second edge 1346 of the elastomeric strap 1320 extends from the first platen 1310 across the tailgate clearance gap 1312 to the second platen 1360, thereby closing the tailgate clearance gap 1312. When the tailgate 1206 is moved between the open position 1308 and the closed position 1409 the elastomeric strap 1320 flexes sufficiently to provide freedom of motion without harm to the functionality of the tailgate shroud 1200 or the associated pick-up truck 102.

As shown in FIGS. 8-14D, a tailgate shroud may be used in in conjunction with a hinge cover 820. Hinge cover 820 may be a rigid or substantially rigid plate and may comprise one or more panels or subcomponents of aluminum, aluminum alloy, steel, HDPE, wood, polypropylene, PVC, ABS polyethylene, or other material chosen with good engineering judgment. The hinge cover 820 may be elongated to define a first cover end 822 and a second cover end 824 opposite first cover end 822. First cover end 822 may comprise first pivot projection 823. Second cover end 824 may comprise second pivot projection 825. The pivot projections 823 and 825 are each adapted to operationally engage with a pivot projection receiver. The first pivot projection 823 may operationally engage with a first pivot projection receiver 826 such that the first pivot projection 823 is fixed in position with respect to the first pivot projection receiver 826, but remains free to rotate and change orientation with respect to the first pivot projection receiver 826. One non-limiting way in which the first pivot projection 823 may be fixed in position with respect to the first pivot projection receiver 826, but remains free to rotate and change orientation with respect to the first pivot projection receiver 826 is for the first pivot projection 823 to define a cylindrical surface or part of a cylindrical surface that mates with a cylindrical surface or part of a cylindrical surface of the first pivot projection receiver 826. The second pivot projection 825 may operationally engage with a second pivot projection receiver 827 such that the second pivot projection 825 is fixed in position with respect to the second pivot projection receiver 827, but remains free to rotate and change orientation with respect to the second pivot projection receiver 827. One non-limiting way in which the second pivot projection 825 may be fixed in position with respect to the second pivot projection receiver 827, but remains free to rotate and change orientation with respect to the second pivot projection receiver 827 is for the second pivot projection 825 to define a cylindrical surface or part of a cylindrical surface that mates with a cylindrical surface or part of a cylindrical surface of the second pivot projection receiver 827. The first pivot projection receiver 826 and the second pivot projection receiver 827 may each be engaged with the associated truck bed either directly or by engagement to platen 1140 or platen 1310. The first pivot projection receiver 826 and the second pivot projection receiver 827 may each be engaged with the associated truck bed either directly or by engagement to platen 1140 or platen 1310 by being integrally formed therewith, or by mechanical fasteners, or by adhesives, or by welding, or other means chosen with good engineering judgment.

The first pivot projection receiver 826 and the second pivot projection receiver 827 may define a hinge cover pivot axis 1298 about which the hinge cover 820 may rotate between a first orientation 1394 and a second orientation 1496 when operationally engaged with the first pivot projection receiver 826 and the second pivot projection receiver 827. In the first orientation 1394 the hinge cover 820 may extend over the elongated tailgate clearance gap 1312. In the second orientation 1496 the hinge cover 820 may be clear of the tailgate 806 when the tailgate 806 is in the closed position 1409.

Further examples consistent with the present subject matter are set out in the following numbered clauses.

Clause 1. A shroud for a truck bed tailgate comprising a set of platens adapted for engagement as a four-bar linkage with an associated pick-up truck wherein the associated pick-up truck has a truck bed of some width W, a tailgate engaged with the truck bed to pivot about a tailgate pivot axis between an open position, and a closed position, and when the tailgate is in the open position, an elongated tailgate clearance gap extending parallel to the tailgate pivot axis; and wherein the set of platens has a first platen defining a first pivot axis, the first platen being adapted to be fixedly engaged with the truck bed with the first pivot axis parallel to the tailgate pivot axis and offset from the tailgate pivot axis by a distance L1, and wherein the first platen defines a first surface; a second platen defining a second pivot axis and a third pivot axis parallel to the second pivot axis and offset from the second pivot axis by a distance L2, the second platen being adapted to be engaged to the first platen such that the second pivot axis and the first pivot axis coincide and the second platen is pivotable about first pivot axis, and wherein the second platen defines a second surface; a third platen defining a fourth pivot axis and a fifth pivot axis parallel to the fourth pivot axis and offset from the fourth pivot axis by a distance L3, the third platen being adapted to be engaged to the second platen such that the fourth pivot axis and the third pivot axis coincide and the third platen is pivotable about third pivot axis, and wherein the third platen defines a third surface; a fourth platen defining a sixth pivot axis, the fourth platen being adapted to be fixedly engaged with the tailgate with the sixth pivot axis parallel to the tailgate pivot axis and offset from the tailgate pivot axis by a distance L4 such that the fourth platen is pivotable about the tailgate pivot axis, the fourth platen further being adapted to be engaged to the third platen such that the sixth pivot axis and the fifth pivot axis coincide, the fourth platen being pivotable about the fifth pivot axis, and wherein the fourth platen defines a fourth surface; a first pivot shaft adapted to pivotably connect the first platen and the second platen along the coincident first pivot axis and second pivot axis; a second pivot shaft adapted to pivotably connect the second platen and the third platen along the coincident third pivot axis and fourth pivot axis; and a third pivot shaft adapted to pivotably connect the third platen and the fourth platen along the coincident fifth pivot axis and sixth pivot axis.

Clause 2. A shrouded truck bed tailgate comprising a truck bed; a tailgate operationally engaged with the truck bed to be pivotable about a tailgate pivot axis between an open position, and a closed position, and a four bar linkage having a ground link defined by the tailgate pivot axis, and a first pivot axis, fixedly engaged to the truck bed, extending parallel to the tailgate pivot axis, and offset from the tailgate pivot axis by a distance L1; an input link defined by a second platen having a second pivot axis and a third pivot axis parallel to the second pivot axis and offset from the second pivot axis by a distance L2, pivotably connected to the ground link by a first pivot shaft to pivot about the first pivot axis such that the first pivot axis and the second pivot axis coincide, and wherein the second platen defines a second surface; a coupler link defined by a third platen having a fourth pivot axis and a fifth pivot axis parallel to the fourth pivot axis and offset from the fourth pivot axis by a distance L3, pivotably connected to the input link by a second pivot shaft to pivot about the third pivot axis such that the third pivot axis and the fourth pivot axis coincide, and wherein the third platen defines a third surface; an output link defined by a fourth platen having a sixth pivot axis parallel to the tailgate pivot axis and offset from the tailgate pivot axis by a distance L4, pivotably connected to the coupler link by a third pivot shaft to pivot about the fifth pivot axis such that the sixth pivot axis and the fifth pivot axis coincide, fixedly engaged to the tailgate to be pivotable with the tailgate about the tailgate pivot axis between the open position, and the closed position, and wherein the fourth platen defines a fourth surface.

Clause 3. A shrouded truck bed tailgate comprising a truck bed; a tailgate operationally engaged with the truck bed to be pivotable about a tailgate pivot axis between an open position, and a closed position, wherein closed position is a 90 degree rotation about the tailgate pivot axis from the open position; and a non-Grashof four bar linkage having a ground link defined by the tailgate pivot axis, and a first pivot axis, fixedly engaged to the truck bed, extending parallel to the tailgate pivot axis, and offset from the tailgate pivot axis by a distance L1, an input link defined by a second platen having a second pivot axis and a third pivot axis parallel to the second pivot axis and offset from the second pivot axis by a distance L2, pivotably connected to the ground link by a first pivot shaft to pivot about the first pivot axis such that the first pivot axis and the second pivot axis coincide, and wherein the second platen defines a second surface, a coupler link defined by a third platen having a fourth pivot axis and a fifth pivot axis parallel to the fourth pivot axis and offset from the fourth pivot axis by a distance L3, pivotably connected to the input link by a second pivot shaft to pivot about the third pivot axis such that the third pivot axis and the fourth pivot axis coincide, and wherein the third platen defines a third surface, and an output link defined by a fourth platen having a sixth pivot axis parallel to the tailgate pivot axis and offset from the tailgate pivot axis by a distance L4, pivotably connected to the coupler link by a third pivot shaft to pivot about the fifth pivot axis such that the sixth pivot axis and the fifth pivot axis coincide, fixedly engaged to the tailgate to be pivotable with the tailgate about the tailgate pivot axis between the open position, and the closed position, and wherein the fourth platen defines a fourth surface; and wherein the relationship of the lengths of the link lengths, L1, L2, L3, and L4 is such that L1+L3−L2−L4 is positive, L1+L4−L2−L3 is positive, and L3+L4−L2−L1 is negative; wherein L2/L1 is between 0.68 and 0.72 inclusive, L3/L1 is between 0.68 and 0.72 inclusive, and L4/L1 is between 0.68 and 0.72 inclusive; and wherein each platen is elongated to extend at least a width of 0.9W in a direction parallel to the tailgate pivot axis.

Clause 4. A shroud for a truck bed tailgate comprising a set of platens adapted for engagement with an associated pick-up truck; wherein the associated pick-up truck has a truck bed of some width W, a tailgate engaged with the truck bed to pivot about a tailgate pivot axis between an open position, and a closed position, and when the tailgate is in the open position, an elongated tailgate clearance gap between the truck bed and the tailgate extending parallel to the tailgate pivot axis; wherein the set of platens has a first platen adapted to be fixedly engaged with the truck bed, the first platen defining a hinge cover pivot axis parallel to the tailgate pivot axis, and offset from the tailgate pivot axis, and one or more additional platens; and a hinge cover, the hinge cover being rotatably engaged with the first platen to rotate about the hinge cover pivot axis between a first orientation wherein it extends over the elongated tailgate clearance gap, and a second orientation wherein it is clear of the tailgate when the tailgate is in the closed position.

Clause 5. A shrouded truck bed tailgate comprising a truck bed; a tailgate operationally engaged with the truck bed to be pivotable about a tailgate pivot axis between an open position, and a closed position, and a set of platens having a first platen fixedly engaged with the truck bed, the first platen defining a hinge cover pivot axis parallel to the tailgate pivot axis, and offset from the tailgate pivot axis, and one or more additional platens; and a hinge cover, the hinge cover being rotatably engaged with the first platen to rotate about the hinge cover pivot axis between a first orientation wherein it extend over the elongated tailgate clearance gap, and a second orientation wherein it is clear of the tailgate when the tailgate is in the closed position.

Non-limiting embodiments have been described, hereinabove. It will be apparent to those skilled in the art that the above methods and apparatuses may incorporate changes and modifications without departing from the general scope of the present subject matter. It is intended to include all such modifications and alterations in so far as they come within the scope of the appended claims or the equivalents thereof.

I claim:

1. A shroud for a truck bed tailgate comprising
a set of platens adapted for engagement with an associated pick-up truck;
wherein the associated pick-up truck has
a truck bed of some width W,
a tailgate engaged with the truck bed to pivot about
a tailgate pivot axis between
an open position, and
a closed position, and
when the tailgate is in the open position, an elongated tailgate clearance gap between the truck bed and the tailgate extending parallel to the tailgate pivot axis;
wherein the set of platens has
a first platen adapted to be fixedly engaged with the truck bed, the first platen defining a hinge cover pivot axis
parallel to the tailgate pivot axis, and
offset from the tailgate pivot axis, and
one or more additional platens rotatably engaged with at least one other platen; and
a hinge cover, the hinge cover being rotatably engaged with the first platen to rotate about the hinge cover pivot axis between
a first orientation wherein it extends over the elongated tailgate clearance gap, and
a second orientation wherein it is clear of the tailgate when the tailgate is in the closed position.

2. The shroud for a truck bed tailgate of claim 1, wherein the first platen further defines
a first pivot axis with the first pivot axis parallel to the tailgate pivot axis and offset from the tailgate pivot axis by a distance L1, and
a first surface.

3. The shroud for a truck bed tailgate of claim 2,
wherein the set of platens is adapted for engagement as a four-bar linkage and further comprises,
a second platen defining a second pivot axis and a third pivot axis parallel to the second pivot axis and offset from the second pivot axis by a distance L2,
the second platen being adapted to be engaged to the first platen such that the second pivot axis and the first pivot axis coincide and the second platen is pivotable about the first pivot axis, and
wherein the second platen defines a second surface;
a third platen defining a fourth pivot axis and a fifth pivot axis parallel to the fourth pivot axis and offset from the fourth pivot axis by a distance L3,
the third platen being adapted to be engaged to the second platen such that the fourth pivot axis and the third pivot axis coincide and the third platen is pivotable about the third pivot axis, and
wherein the third platen defines a third surface;
a fourth platen defining a sixth pivot axis,
the fourth platen being adapted to be fixedly engaged with the tailgate with the sixth pivot axis parallel to the tailgate pivot axis and offset from the tailgate pivot axis by a distance L4 such that the fourth platen is pivotable about the tailgate pivot axis,
the fourth platen further being adapted to be engaged to the third platen such that the sixth pivot axis and the fifth pivot axis coincide,
the fourth platen being pivotable about the fifth pivot axis, and
wherein the fourth platen defines a fourth surface; and
wherein the shroud further comprises,
a first pivot shaft adapted to pivotably connect the first platen and the second platen along the coincident first pivot axis and second pivot axis;
a second pivot shaft adapted to pivotably connect the second platen and the third platen along the coincident third pivot axis and fourth pivot axis; and
a third pivot shaft adapted to pivotably connect the third platen and the fourth platen along the coincident fifth pivot axis and sixth pivot axis.

4. The shroud for a truck bed tailgate of claim 3, wherein tailgate closed position is a 90 degree rotation about the tailgate pivot axis from the tailgate open position.

5. The shroud for a truck bed tailgate of claim 4, wherein the four-bar linkage does not satisfy the Grashof condition.

6. The shroud for a truck bed tailgate of claim 5, wherein the relationship of the lengths of the link lengths, L1, L2, L3, and L4 is such that
L1+L3−L2−L4 is positive;
L1+L4−L2−L3 is positive; and
L3+L4−L2−L1 is negative.

7. The shroud for a truck bed tailgate of claim 6, wherein, when the tailgate is in the open position, the second surface, the third surface, and the fourth surface form a continuous smooth surface.

8. The shroud for a truck bed tailgate of claim 7, wherein the first platen is elongated to extend at least a width of 0.9W in a direction parallel to the tailgate pivot axis.

9. The shroud for a truck bed tailgate of claim 1,
wherein the first platen further comprises an elastomeric strap, the elastomeric strap being elongated in a first direction to define a first edge and a second edge opposite the first edge,
the first edge being fixedly engaged with the first platen, and
the second edge extending outwardly from the first platen toward the tailgate; and
wherein the one or more additional platens comprises a second platen fixedly engaged to the tailgate such that, when the tailgate is in the open position, the second platen extends into the tailgate clearance gap and contacts the distal end of the elastomeric strap.

10. The shroud for a truck bed tailgate of claim 9, wherein the first platen is elongated to extend at least a width of 0.9W in a direction parallel to the tailgate pivot axis.

11. A shrouded truck bed tailgate comprising
a truck bed;
a tailgate operationally engaged with the truck bed to be pivotable about a tailgate pivot axis between
an open position, and
a closed position, and
a set of platens having
a first platen fixedly engaged with the truck bed, the first platen defining a hinge cover pivot axis
parallel to the tailgate pivot axis, and
offset from the tailgate pivot axis, and
one or more additional platens rotatably engaged with at least one other platen; and a hinge cover, the hinge cover being rotatably engaged with the first platen to rotate about the hinge cover pivot axis between
    a first orientation wherein it extend over the elongated tailgate clearance gap, and
    a second orientation wherein it is clear of the tailgate when the tailgate is in the closed position.

12. The shrouded truck bed tailgate of claim 11, wherein the first platen further defines
    a first pivot axis with the first pivot axis parallel to the tailgate pivot axis and offset from the tailgate pivot axis by a distance L1, and
    a first surface.

13. The shrouded truck bed tailgate of claim 12, wherein the set of platens is adapted for engagement as a four-bar linkage and further comprises,
    a second platen defining a second pivot axis and a third pivot axis parallel to the second pivot axis and offset from the second pivot axis by a distance L2,
        the second platen being adapted to be engaged to the first platen such that the second pivot axis and the first pivot axis coincide and the second platen is pivotable about the first pivot axis, and
        wherein the second platen defines a second surface;
    a third platen defining a fourth pivot axis and a fifth pivot axis parallel to the fourth pivot axis and offset from the fourth pivot axis by a distance L3,
        the third platen being adapted to be engaged to the second platen such that the fourth pivot axis and the third pivot axis coincide and the third platen is pivotable about the third pivot axis, and
        wherein the third platen defines a third surface;
    a fourth platen defining a sixth pivot axis,
        the fourth platen being adapted to be fixedly engaged with the tailgate with the sixth pivot axis parallel to the tailgate pivot axis and offset from the tailgate pivot axis by a distance L4 such that the fourth platen is pivotable about the tailgate pivot axis,
        the fourth platen further being adapted to be engaged to the third platen such that the sixth pivot axis and the fifth pivot axis coincide,
        the fourth platen being pivotable about the fifth pivot axis, and
        wherein the fourth platen defines a fourth surface; and wherein the shroud further comprises,
    a first pivot shaft adapted to pivotably connect the first platen and the second platen along the coincident first pivot axis and second pivot axis;
    a second pivot shaft adapted to pivotably connect the second platen and the third platen along the coincident third pivot axis and fourth pivot axis; and
    a third pivot shaft adapted to pivotably connect the third platen and the fourth platen along the coincident fifth pivot axis and sixth pivot axis.

14. The shrouded truck bed tailgate of claim 13, wherein tailgate closed position is a 90 degree rotation about the tailgate pivot axis from the tailgate open position.

15. The shrouded truck bed tailgate of claim 14, wherein the four-bar linkage does not satisfy the Grashof condition.

16. The shrouded truck bed tailgate of claim 15, wherein the relationship of the lengths of the link lengths, L1, L2, L3, and L4 is such that
    $L1+L3-L2-L4$ is positive;
    $L1+L4-L2-L3$ is positive; and
    $L3+L4-L2-L1$ is negative.

17. The shrouded truck bed tailgate of claim 16, wherein, when the tailgate is in the open position, the second surface, the third surface, and the fourth surface form a continuous smooth surface.

18. The shrouded truck bed tailgate of claim 17, wherein the first platen is elongated to extend at least a width of 0.9W in a direction parallel to the tailgate pivot axis.

19. The shrouded truck bed tailgate of claim 11,
    wherein the first platen further comprises an elastomeric strap, the elastomeric strap being elongated in a first direction to define a proximate end and a distal end opposite the proximate end,
        the proximate end being fixedly engaged with the first platen, and
        the distal end extending outwardly from the first platen toward the tailgate; and
    wherein the one or more additional platens comprises a second platen fixedly engaged to the tailgate such that, when the tailgate is in the open position, the second platen extends into the tailgate clearance gap and contacts the distal end of the elastomeric strap.

20. The shrouded truck bed tailgate of claim 19, wherein the first platen is elongated to extend at least a width of 0.9W in a direction parallel to the tailgate pivot axis.

* * * * *